US010024042B2

(12) United States Patent
Mendez

(10) Patent No.: US 10,024,042 B2
(45) Date of Patent: *Jul. 17, 2018

(54) DEVICES FOR MOVING A TOILET, AND RELATED METHODS AND KITS

(71) Applicant: Mike Edward Mendez, Sacramento, CA (US)

(72) Inventor: Mike Edward Mendez, Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/646,067

(22) Filed: Jul. 10, 2017

(65) Prior Publication Data

US 2017/0306605 A1  Oct. 26, 2017

Related U.S. Application Data

(63) Continuation of application No. 15/159,107, filed on May 19, 2016, now Pat. No. 9,732,505.

(Continued)

(51) Int. Cl.
*B65G 7/12* (2006.01)
*E03D 11/00* (2006.01)

(52) U.S. Cl.
CPC ............... *E03D 11/00* (2013.01); *B65G 7/12* (2013.01); *B65G 2207/08* (2013.01); *B65G 2813/023* (2013.01)

(58) Field of Classification Search
CPC ............... B65G 7/12; B65G 2207/08; B65G 2813/023; E03D 11/00

(Continued)

(56) References Cited

U.S. PATENT DOCUMENTS 765,674 A * 7/1904 Normandin
813,060 A  2/1906 Rowell
(Continued)

FOREIGN PATENT DOCUMENTS

CA  2917574 A1  1/2015
CN  2561983  7/2003
(Continued)

OTHER PUBLICATIONS

Int'l Search Report in Application No. PCT/CA2014/050452, dated Sep. 18, 2014, 6 pages.
(Continued)

*Primary Examiner* — Dean J Kramer
(74) *Attorney, Agent, or Firm* — Willink & Hunt LLP; Marcus T. Hunt

(57) ABSTRACT

In certain aspects, devices and methods for moving a toilet are provided that can include an elongated member, first and second connectors coupled to the elongated member, first and second extension elements coupled to the respective first and second connectors and extending radially away from the elongated member. The first connector having a locking element and one or more through-holes disposed therein. The first and second extension elements include contact surfaces that are configured to engage the toilet. In other aspects, devices and methods for moving a toilet can include a handle, first and second collars coupled to the handle, and first and second shackles coupled to the respective first and second collars. In some instances, the shackles are adjustable along a radial direction extending from the handle. In some instances, the devices and methods include a collar having a locking lever and one or more through-holes.

23 Claims, 14 Drawing Sheets

Related U.S. Application Data

(60) Provisional application No. 62/179,899, filed on May 21, 2015.

(58) Field of Classification Search
USPC ......... 294/15, 16, 34, 62, 93, 141, 158, 165, 294/168, 170
See application file for complete search history.

(56) References Cited

U.S. PATENT DOCUMENTS

| | | | |
|---|---|---|---|
| 824,822 A | 7/1906 | Samuelson | |
| 848,124 A | 3/1907 | Peeler | |
| 1,843,245 A * | 2/1932 | Sederland | A45F 5/10 294/15 |
| 2,224,805 A | 12/1940 | York | |
| 2,604,352 A | 7/1952 | Aden | |
| 2,968,510 A * | 1/1961 | Ellis | B65G 7/12 294/15 |
| 3,262,590 A | 7/1966 | Lynn | |
| 3,391,905 A | 7/1968 | Bums | |
| 4,641,874 A | 2/1987 | Grenzer | |
| 5,184,653 A | 2/1993 | Lacy | |
| 5,203,065 A | 4/1993 | Peters | |
| 5,373,593 A | 12/1994 | Decky et al. | |
| 5,520,326 A | 5/1996 | Schmidt | |
| 5,556,076 A | 9/1996 | Jacquay | |
| 6,015,137 A | 1/2000 | Guevara et al. | |
| 6,135,466 A | 10/2000 | Irwin | |
| 6,685,170 B1 | 2/2004 | Gwynn | |
| 6,752,379 B1 | 6/2004 | Wall | |
| 6,886,192 B1 | 5/2005 | Merrill | |
| 7,134,151 B1 | 11/2006 | Cheramie | |
| 7,231,674 B1 | 6/2007 | Cernik | |
| 7,798,469 B2 | 9/2010 | Junca | |
| 7,823,862 B2 | 11/2010 | Wakil | |
| 7,841,028 B1 | 11/2010 | Rojas | |
| 9,091,048 B2 | 7/2015 | Arthurs et al. | |
| 9,096,248 B2 | 8/2015 | Herb | |
| 9,701,477 B2 | 7/2017 | Willim | |
| 9,732,505 B2 * | 8/2017 | Mendez | E03D 11/00 |
| 2007/0057475 A1 * | 3/2007 | Hadar | B62B 5/049 280/43.12 |
| 2008/0109957 A1 | 5/2008 | Blancke | |
| 2012/0187357 A1 | 7/2012 | Jordan et al. | |

FOREIGN PATENT DOCUMENTS

| | | |
|---|---|---|
| EP | 3019422 A1 | 5/2016 |
| GB | 2416905 A | 2/2006 |
| IN | 201637004408 | 6/2016 |
| WO | 2015003258 A1 | 1/2015 |

OTHER PUBLICATIONS

Pick Up Stix Website Archive—Jan. 10, 2016, retrieved on Jul. 25, 2016 from http://web.archive.org/web/20160125080300/http://www.pickupstix.ca/ (2 pages).

Pick Up Stix website, www.pickupstix.ca, Winnipeg Web Design by Websites.ca, screenshot captured Jul. 12, 2016, 6 pages.

* cited by examiner

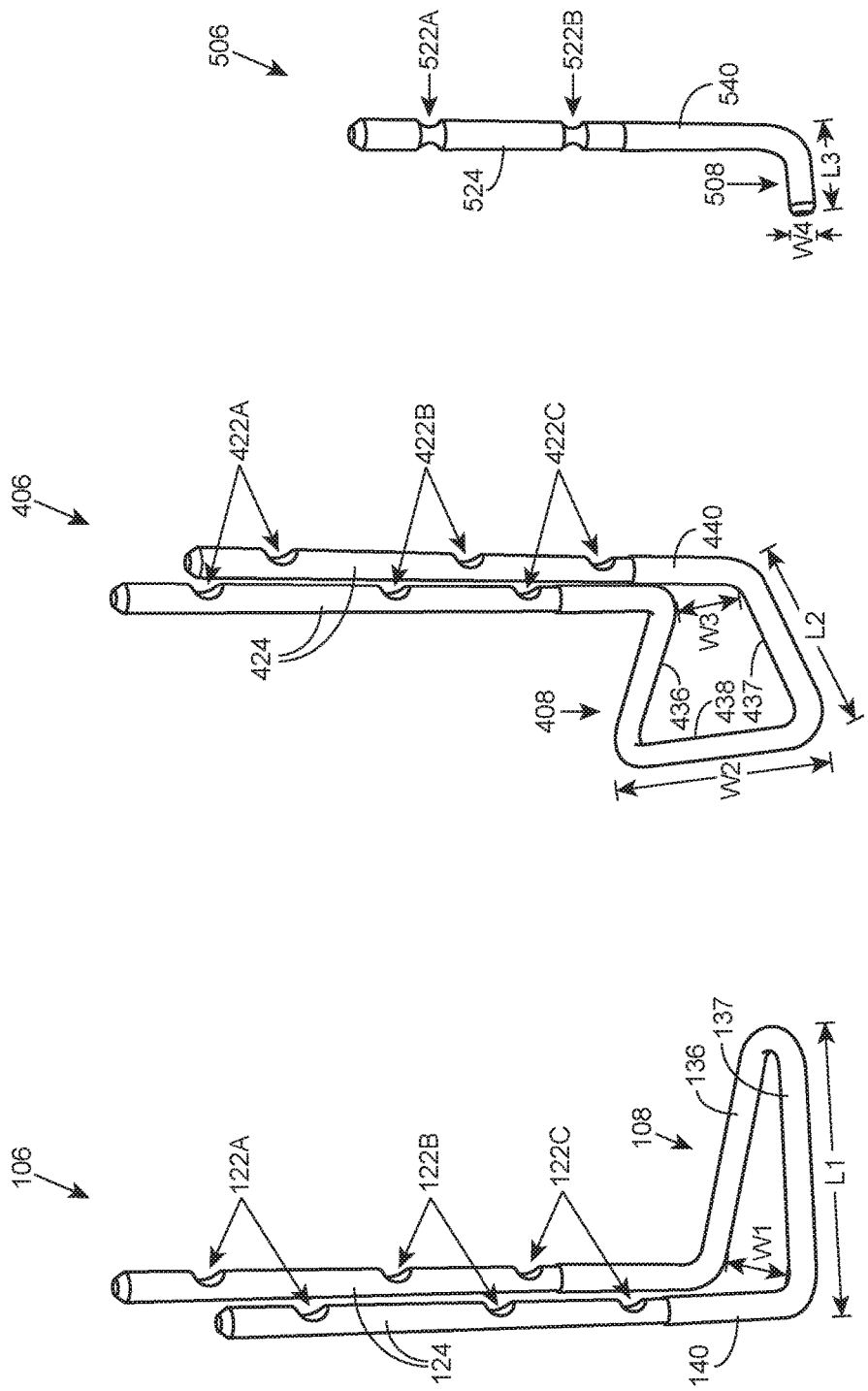

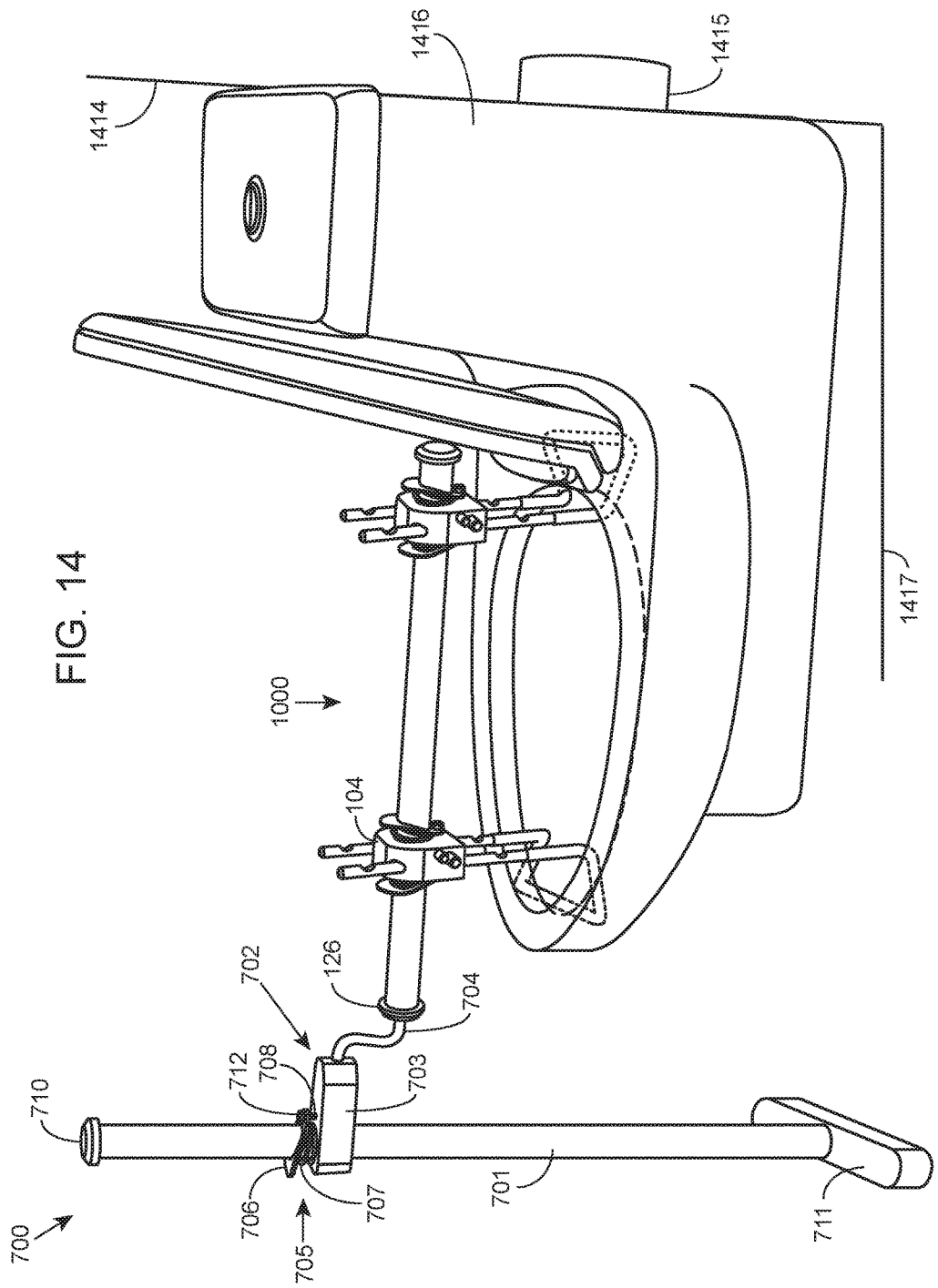

DEVICES FOR MOVING A TOILET, AND RELATED METHODS AND KITS

CROSS-REFERENCE TO RELATED APPLICATIONS

This application is a continuation of U.S. patent application Ser. No. 15/159,107, filed on May 19, 2016, now U.S. Pat. No. 9,732,505, which claims benefit under 35 U.S.C. § 119(e) of U.S. Provisional Application No. 62/179,899, filed May 21, 2015, each of which is incorporated herein by reference in its entirety.

FIELD OF THE INVENTION

The subject matter of the present disclosure relates generally to the field of tools. More particularly, the present disclosure relates to tools for moving toilets.

BACKGROUND OF THE INVENTION

Toilets may need to be moved for a variety of reasons, such as for transportation, installation, repair work, etc. Toilets, however, are bulky and cumbersome, which can make it difficult for a person to securely grab and lift. Typically, a person will straddle the toilet, bend over to awkwardly grab and lift the toilet, and then slowly shuffle his or her feet while bending over and holding the toilet. This can place excess strain on the person's back and potentially injure the person. Moreover, moving the toilet in this manner may not be practical or possible for significant distances, and may even prove difficult for short distances. This manner of moving a toilet can cause a person to stumble or prematurely lower the toilet, which can possibly lead to damaging the toilet or soiling the floor. Furthermore, a person may have little to no visibility of where his or her feet are in relation to the ground. This can increase the risk of injury to the user and damage to the toilet.

Used toilets can also be unsanitary to touch if they are dirty and not thoroughly cleaned beforehand. Often, a person is required to hold the toilet in close proximity (e.g., "hug" the toilet) to lift and carry the toilet. Also, in an attempt to get a firm hold on the toilet, a person can try holding the rim of the toilet or inserting one's hand into the toilet bowl. These techniques, however, can subject the person to germs, such as fungi, bacteria, and viruses.

People sometimes resort to using dollies or other transport systems to move a toilet. Dollies and other transport systems tend to be relatively large, however, and can present their own set of issues. The systems can be bulky and expensive for instance. Furthermore, due to their size, structure, or weight, these systems can lack portability and can be inconvenient to set up, store, or transport. These attributes can also prove inconvenient and impractical during use. For example, these systems typically have a frame with legs or wheels that contact the ground while the toilet is lifted off the ground. This can make it difficult to move the toilet over rough or uneven surfaces. It can also make it extremely difficult, if not impossible, to move the toilet up or down stairs in a safe and careful manner. Even with a hand truck dolly, it can be hard to lift or lower the toilet up or down each step in a careful and smooth manner that does not bang or jolt the toilet with each step. Moreover, it can be difficult to simply lift and lower a heavy toilet in a slow and controlled manner with a hand truck dolly. These systems can thus lack a level of user control, which can increase the risk of damage to the toilet.

SUMMARY OF THE INVENTION

In certain aspects of the present disclosure, a hand-held device for moving a toilet is provided that can include an elongated member, a first engaging member, and a second engaging member. The first engaging member and the second engaging member can be coupled to the elongated member and extend radially away from the elongated member. The first engaging member can include a first contact surface that is disposed distal to the elongated member and that is configured to engage the toilet. The second engaging member can include a second contact surface that is disposed distal to the elongated member and that is configured to engage the toilet.

In certain aspects of the present disclosure, a method of moving a toilet is provided that can include coupling a hand-held device to the toilet. The hand-held device can include an elongated member, a first engaging member, and a second engaging member. The first engaging member and the second engaging member can be coupled to the elongated member and extend radially away from the elongated member. The first engaging member can include a first contact surface that is disposed distal to the elongated member and that is configured to engage the toilet. The second engaging member can include a second contact surface that is disposed distal to the elongated member and that is configured to engage the toilet. The method can also include applying force to the elongated member to move the toilet.

In certain aspects of the present disclosure, a hand-held device for moving a toilet is provided that can include a handle, a first collar, and a second collar. The first collar can be coupled to the handle and can be configured to slide along the handle in a first unlocked mode and to positionally secure along the handle in a first locked mode. The first collar can be configured to receive and secure to one or more removable shackles. The second collar can be coupled to the hand and can be configured to slide along the handle in a second unlocked mode and to positionally secure along the handle in a second locked mode. The second collar can be configured to receive and secure to one or more removable shackles.

In certain aspects of the present disclosure, a method of moving a toilet is provided that can include coupling a hand-held device to the toilet. The hand-held device can include a handle, a first collar, and a second collar. The first collar can be coupled to the handle and can be configured to slide along the handle in a first unlocked mode and to positionally secure along the handle in a first locked mode. The first collar can be configured to receive and secure to one or more removable shackles. The second collar can be coupled to the hand and can be configured to slide along the handle in a second unlocked mode and to positionally secure along the handle in a second locked mode. The second collar can be configured to receive and secure to one or more removable shackles.

BRIEF DESCRIPTION OF THE DRAWINGS

For a better understanding of at least certain embodiments, reference will be made to the following Detailed Description, which is to be read in conjunction with the accompanying drawings, wherein:

FIG. 3 depicts a perspective view of an extension element shown in FIGS. 1A and 1B, according to an embodiment.

FIG. 4 depicts a perspective view of an extension element, according to an embodiment.

FIG. 5 depicts a perspective view of an extension element, according to an embodiment.

FIG. 14 depicts a perspective view of the stabilizing adaptor shown in FIG. 7 when coupled to a device for moving a toilet, according to an embodiment.

DETAILED DESCRIPTION OF THE INVENTION

Figure 1A:
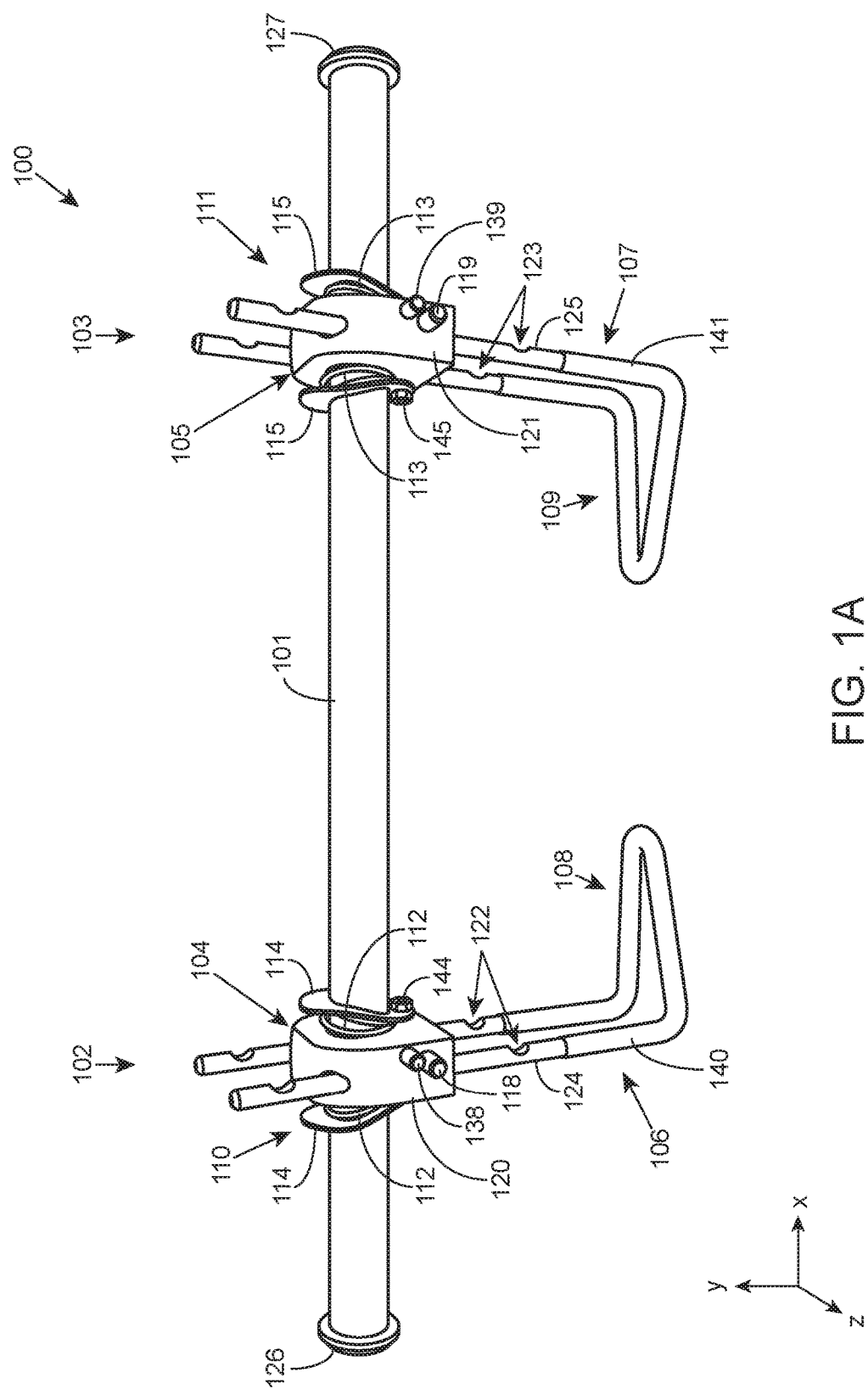
FIG. 1A depicts a perspective view of a device for moving a toilet, according to an embodiment.

Before the present invention is described in greater detail, it is to be understood that this invention is not limited to particular embodiments described, as such can, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges can independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which can be readily separated from or combined with the features of any of the other several embodiments without departing from the scope or spirit of the present invention. Any recited method can be carried out in the order of events recited or in any other order that is logically possible.

In further describing various aspects of the invention, aspects of embodiments of the subject device for moving a toilet are described first in greater detail. Next, embodiments of methods of moving a toilet in which the subject toilet moving device can find use are reviewed in greater detail. Lastly, kits for the devices and for use in practicing the methods are also provided Devices for Moving a Toilet As summarized above, in certain aspects a hand-held device for moving a toilet is provided that can include an elongated member, a first engaging member, and a second engaging member. The first engaging member and the second engaging member can be coupled to the elongated member and extend radially away from the elongated member. The first engaging member can include a first contact surface that is disposed distal to the elongated member and that is configured to engage the toilet. The second engaging member can include a second contact surface that is disposed distal to the elongated member and that is configured to engage the toilet. In addition, in certain aspects a handheld device for moving a toilet is provided that can include a handle, a first collar, and a second collar. The first collar can be coupled to the handle and can be configured to slide along the handle in a first unlocked mode and to positionally secure along the handle in a first locked mode. The first collar can be configured to receive and secure to one or more removable shackles. The second collar can be coupled to the hand and can be configured to slide along the handle in a second unlocked mode and to positionally secure along the handle in a second locked mode. The second collar can be configured to receive and secure to one or more removable shackles In certain aspects, a device for moving a toilet is provided. The term "moving" (or "move", or "moved") is used broadly herein with respect to moving a toilet, and can include lifting, sliding, carrying, toting, transporting, shifting, displacing, setting, mounting, etc., a toilet. The device can be a hand-held device that couples to the toilet by engaging one or more areas of the toilet, either directly or via an adaptor coupled to the toilet. The term "engaging" (or "engage", or "engaged with") is used broadly herein with respect to a toilet, and can include coupling, joining, uniting, interconnecting, bringing into contact or bringing together, etc. Once coupled to the toilet, the device can enable a user to hold (or grasp) the device with one or both hands and move the toilet. In some instances, the device can also enable more than one person to simultaneously hold the device and move the toilet.

The device can be coupled to the toilet by engaging various areas of the toilet in different manners. For example, the device can couple to the toilet by engaging a neck of the toilet from around the neck; by engaging the neck of the toilet through seat holes (or seat bolt holes) in the neck; by engaging the neck of the toilet via an adaptor that is coupled to the neck of the toilet; by engaging the rim of a rim of a toilet bowl; by engaging an exterior of the toilet bowl from around the bowl; or by engaging a combination of one of the preceding areas and manners, such as by engaging the rim of the bowl and the neck, either directly or via the adaptor coupled to the neck. The term "neck" or phrase "neck of the toilet" is used broadly herein to refer to the general area of the toilet that is adjacent to the rim of the toilet bowl, and which typically connects the rim of the toilet bowl to other areas or components of the toilet. The neck can often extend from the rim of the toilet bowl and toward the back end of the toilet, such as towards the toilet tank. The neck can often include holes (which may also be referred to herein as "seat holes") that enable the toilet seat to be bolted (or screwed) to the toilet. The term "seat" is used broadly herein and may refer to the toilet seat, the lid on the toilet seat, or both.

As stated above, the device for moving a toilet can include an elongated member. The elongated member can couple to the engaging members and can function as a handle for the user to hold when moving the toilet. The user can hold any area on the elongated member that enables the user to adequately move the toilet as desired. The elongated member can be made from one or more materials that are sufficient in strength to support the weight of the toilet when moving the toilet. Example materials can include, but are not limited to, one or more metals, metal alloys, polymers, or combination thereof. In one embodiment, the elongated member can be made from stainless steel. The elongated member can be rigid in one embodiment, or can provide minimal flex in another embodiment. In one embodiment, the elongated member can include a handle or coating made from a different material (e.g., rubber or other polymer) to enhance grip.

The size and shape of the elongated member can vary in different embodiments. Since the elongated member functions as a handle for the user to grip when moving the toilet, the cross-sectional size and shape of the elongated member can affect the comfort or grip of the user. The cross-sectional shape and size of the elongated member should not inhibit or prevent the user from adequately holding the elongated member. Example cross-sectional shapes of the elongated member can include, but are not limited to, a circle, oval, square, polygon, or other regular or irregular geometric shape. In one embodiment, the cross-sectional shape is a circle. Example cross-sectional sizes (e.g., diameters or widths) of the elongated member can include, but are not limited to, cross-sectional sizes ranging between ½ in. and 3 in., such as cross-sectional sizes ranging between ¾ in. and 1½ in. In one embodiment, the cross-sectional size of the elongated member is approximately 1 in. It should be appreciated that the elongated member can have cross-sectional sizes and shapes outside of these exemplary ranges in other embodiments.

The length of the elongated member can vary in different embodiments. The length of the elongated member should be long enough to adequately maintain the engaging members at the necessary width (or distance) to adequately engage the desired area of the toilet. For example, if the engaging members are to engage opposite sides of the rim of the bowl, the elongated member should be at least as long as the distance between the opposite sides of the bowl. Furthermore, if two or more users are to hold the elongated member outside of the engaging members, the elongated member should also include sufficient length necessary for each user to hold the elongated member outside of the engaging members. In one embodiment, the length of the elongated member can be selected to enable the device to couple to the toilet in multiple areas and manners, as well as enabling more than one user to hold the device. Example lengths of the elongated member can include, but are not limited to, lengths ranging between 10 in. and 30 in., such as lengths ranging between 15 in. and 21 in. It should be appreciated that the elongated member can have lengths outside of these exemplary ranges in other embodiments.

In one embodiment, the elongated member can include one or more end caps that prevent the engaging members from coming off the ends of the elongated member. The end caps can be made from one or more of a variety of materials. Example materials can include, but are not limited to, one or more metals, metal alloys, polymers, or combination thereof. For example, in one embodiment, the end caps can be made from a high strength industrial plastic, such as one from the King Starboard® family of plastics made by King Plastic Corporation. In one embodiment, the end cap can be made from rubber or other polymeric material.

As stated above, the device for moving a toilet can include engaging members. The device can be securely coupled to the toilet when each engaging member is properly engaged with a desired area on the toilet in a desired manner. As stated above, each engaging members can be coupled to the elongated member and extend radially away from the elongated member. Each engaging members can include a contact surface that is disposed distal to the elongated member and that is configured to engage the toilet. The contact surface can be disposed on the engaging member distal to the elongated member. The distance that the contact surface is distal to the elongated member is also referred to herein as the "distal distance" between the contact surface and the elongated member. The distal distance can vary in different embodiments. Example distal distances can include, but are not limited to, distal distances of 1½ in. or greater, such distal distances of 2½ in. or greater. In one embodiment, the distal distance is greater than ½ in. and specifically excludes distal distances smaller than ½ in. It should be appreciated that the distal distances can be outside of these exemplary ranges in other embodiments. In one embodiment, the engaging member can be adjustable to vary the distal distance of the contact surface.

The shape and size of the contact surface can vary to properly engage the toilet in different areas and manners. In one embodiment, the engaging member can be bent to form a contact surface (e.g., a lip or platform) with a shape to properly engage the toilet in a desired area and manner. While a specific shape and size of the contact surface can be well suited for engaging the toilet in a specific area and manner, it should be appreciated that the contact surface can also be suitable to engage the toilet in other areas and manners in some instances.

The contact surface can be oriented to face in a direction towards the elongated member, as opposed to a direction away from the elongated member. For example, the normal vector to the contact surface can point in a direction towards the elongated member, rather than away from the elongated member. In this way, when engaged by the contact surface of the engaging member, the engaged area on the toilet or adaptor is disposed between the contact surface and the elongated member. The contact surface can be angled at various angles with respect to the elongated member (or with respect to the longitudinal axis of the elongated member). In one embodiment, the contact surface can be parallel or approximately parallel to the elongated member. In one embodiment, the contact surface can be angled with respect to the elongated member (or not parallel with the elongated member) such that the contact surface becomes closer to the elongated member as it extends away from the engaging member. In another embodiment, the contact surface can be angled such that the contact surface becomes slightly farther away from the elongated member as it extends away from the engaging member. In such configuration, however, the angle should be limited to angles that enable the toilet to be properly engaged in a safe and secure manner when moving the toilet.

When two engaging members are coupled to the elongated member, the terms "inward" and "outward" is used herein to refer to whether a contact surface of an engaging member extends towards the other engaging member or away from the other engaging member, respectively. For example, if both of the contact surfaces of the engaging members extend inward, then both contact surfaces are disposed between the two engaging members. On the other hand, if both of the contact surfaces of the engaging members extend outward, then both of the contact surfaces are disposed outside of the two engaging members. Furthermore, if a first contact surface of one engaging member extends inward while a second contact surface of the other engaging member extends outward, then the first contact surface is disposed between the two engaging members and the second contact surface is disposed outside of the two engaging members.

In some instances, a contact surface can be oriented to extend in a direction that is well suited for engaging the toilet in a desired area and manner. For example, both contact surfaces of the engaging members can extend outward to engage both contact surfaces to the rim of the bowl. As another example, both contact surfaces of the engaging members can extend inward to engage both contact surfaces to the neck of the toilet from around the neck, or to engage both contact surfaces to the exterior of the toilet bowl from around the toilet bowl.

An engaging member can be configured to displace longitudinally along the elongated member. The engaging member can include a locking mechanism that has a locked mode and unlocked mode. When in the locked mode (or "locked"), the locking mechanism can enable the engaging member to be fixed (or secured) longitudinally along the elongated member. In this way, the engaging member is secured to a longitudinal position (or positionally secured) along the elongated member. When in an unlocked mode (or "unlocked"), the locking mechanism can enable the engaging member to displace longitudinally along the elongated member. Both of the engaging members can include a locking mechanism. In this way, both engaging members can be displaced longitudinally along the elongated member to properly engage the toilet and to become locked thereafter. In another embodiment, only one engaging member includes a locking mechanism and can be displaced longitudinally along the elongated member when unlocked. In such case, the other engaging member can remain fixed. It should be appreciated that the locking mechanism coupled to the engaging member can be a separate element from the engaging member and couple thereto, or can be integrated within (or as an integral part of) the engaging member.

Various types of locking mechanisms can be implemented in different embodiments. For example, the locking mechanism can be friction based and apply friction to the elongated member to enter the locked mode and remove friction to enter the unlocked mode. For instance, the locking mechanism can include a screw-based or clamp-based shaft collar. To enable the user to quickly and easily lock and unlock the engaging member, the locking mechanism can include a quick-release shaft collar. In one embodiment, the locking mechanism can include a spring that is biased to provide the necessary friction to lock the engaging member. For example, the locking mechanism can include one or more springs held under tension between two friction washers to provide the necessary friction to lock the engaging member. The user can, for instance, unlock the engaging member by providing the necessary force to reorient the friction washers (e.g., squeezing the friction washers together and further compressing the spring) to reduce or remove the friction.

In one embodiment, the engaging member can include a connector that couples the engaging member to the elongated member. The connector can removably couple to the elongated member. In one embodiment, the connector can be a collar that can be placed onto an end of the elongated member and displaced longitudinally along the elongated member. In one embodiment, end caps can be coupled to the ends of the elongated member to prevent the connector from coming off the elongated member. The connector (e.g., collar) can include the previously described locking mechanism that enables the connector (and the engaging member as a whole) to displace longitudinally along the elongated member when unlocked or to remain fixed longitudinally when locked. It should be appreciated that the locking mechanism coupled to the connector can be a separate element from the connector and couple thereto, or can be integrated within (or as an integral part of) the connector.

In one embodiment, the engaging member can include an extension element that couples to (or secures to) the connector and which extends radially away from the elongated member. In one embodiment, the extension element can removably couple to the connector. In one embodiment, different types of extension elements can be coupled to, and removed from, the connector as desired. The extension element can be coupled to (e.g., locked within, screwed to, clamped to, mated with, fastened to, etc.) the connector in various manners in different embodiments. In one embodiment, the extension element can be a shackle having one or more legs that secure to the connector. The shackle can, for instance, be formed from a cylindrical rod that is bent in a general U-shape (or V-shape) with the contact surface formed thereon. The contact surface can be formed in a variety of shapes and sizes and is not limited to a U-shape (or V-shape). In one embodiment, the extension element (e.g., shackle) can insert into one or more holes (or openings) in the connector and become locked (or secured) within the one or more holes by a locking element. The one or more holes can be through-holes so that the extension element can extend through the connector.

The extension element can include the previously described contact surface that engages the toilet in the desired area and manner. The contact surface can be disposed on the engaging member distal to the elongated member. In one embodiment, the contact surface can be formed from the extension element. For example, the extension element can be bent to form the contact surface that is oriented to face in a direction towards the elongated member, as opposed to a direction away from the elongated member. Various shaped and sized contact surfaces can be provided for properly engaging the toilet in different areas and manners. In this way, the user can remove and couple various extension elements with differently shaped and sized contact surfaces depending on the desired area and manner for engagement. In another embodiment, the contact surface can be a component (e.g., platform) that is coupled to (e.g., screwed to, bolted to, mated with, fastened to, etc.) the extension element. In some instances, the contact surface can be removably coupled to the extension element to enable the user to utilize differently shaped and sized contact surfaces.

The distal distance of the contact surface can vary in different embodiments. The distal distance of the contact surface to the elongated member can depend on various factors, such as the length of the extension element, how the extension element couples to the connector (e.g., how far the extension element is inserted and locked within the collar), and the size of the collar. In one embodiment, the device can be configured to enable the user to adjust the distal distance. For example, the extension element and connector can be configured to secure the extension element within one or more holes in the connector at various lengths so that the distal distance can be varied. For instance, the extension element (e.g., shackle) can have one or more grooves disposed at various points along one or more legs of the extension element. The one or more grooves can work in conjunction with a locking element of the connector (e.g., collar) to secure the extension element to the connector at various lengths. The number of lengths at which the extension element can be coupled to the connector can vary in different embodiments. Example number of lengths at which the extension element can be coupled to the connector can include, but are not limited to, two lengths or greater, such as two to ten lengths. In one embodiment, the extension element can be connected to the connector at two to five lengths.

In one embodiment, the extension element and connector can be configured to only couple to each other when the extension element is properly oriented with respect to the connector, such as oriented with the contact surface extending either inward or outward. For example, in one embodiment, an extension element (e.g., shackle) configured to engage the rim of the toilet bowl can be properly oriented when the contact surface extends outward. In such case, the extension element can only be coupled to (e.g., locked within) the connector with the contact surface extending outward. As another example, an extension element that is configured to engage the neck from around the neck, or that is configured to engage the exterior of the bowl from around the bowl, can be properly oriented when the contact surface extends inward. In such case, the extension element can only be coupled to the connector with the contact surface extending inward. As similarly explained before, when two connectors (e.g., collars) are coupled to the elongated member, the terms "inward" and "outward" can be used herein to refer to whether a contact surface of an extension element (e.g., shackle) extends towards the other connector or away from the other connector, respectively. For example, if both of the contact surfaces extend inward, then both contact surfaces can be disposed between the two connectors. If both of the contact surfaces extend outward, then both of the contact surfaces can be disposed outside of the two connectors. Furthermore, if a first contact surface extends inward while a second contact surface extends outward, then the first contact surface can be disposed between the two connectors and the second contact surface can be disposed outside of the two connectors. In one embodiment, the extension element can include one or more grooves that ensure that the extension element is properly oriented for coupling to the connector. For instance, the grooves may be disposed on a specific side of the leg of the extension element to ensure that the contact surface extends in a specific direction, such as inward or outward.

The length of the extension element can vary in different embodiments. The length of the extension element can vary depending on the area and manner in which the device couples to the toilet. Example lengths of an extension element that engages the neck or rim of the toilet can include, but are not limited to, lengths ranging between 3 in. to 15 in., such as 5 in. to 12 in. In one embodiment, the lengths range from 6 in. to 9 in. It should be appreciated that the lengths of the extension element can be outside of these exemplary ranges in other embodiments. Example lengths of an extension element that couples to the exterior of the bowl can include, but are not limited to, lengths ranging between 8 in. to 35 in., such as 10 in. to 25 in. In one embodiment, the lengths range from 12 in. to 20 in. It should be appreciated that the lengths of the extension element can be outside of these exemplary ranges in other embodiments.

The engaging member, or parts thereof, can be made from one or more materials in different embodiments. The engaging member, or parts thereof, can be made from a material that is sufficient in strength to support the weight of the toilet when moving the toilet. Example materials can include, but are not limited to, one or more metals, metal alloys, polymers, or combination thereof. For example, in one embodiment, the collars can be made from a high strength industrial plastic, such as one from the King Starboard® family of plastics made by King Plastic Corporation. In one embodiment, the extension elements can be made from a metal or metal alloy, such as stainless steel. In one embodiment, the extension element can have a protective layer (e.g., rubber coating) over at least a portion of the extension element that includes the contact surface to prevent scratching, cracking, or chipping the toilet when engaging the toilet.

Adaptor for Coupling the Device to the Toilet

In certain aspects of the present disclosure, an adaptor can be provided that removably couples to the neck of the toilet and enables the device to couple to the neck of the toilet via the adaptor. The adaptor can also be referred to herein as the "coupling adaptor" for reference purposes. For example, the user can utilize the coupling adaptor when coupling the device directly to the neck is not readily available. For example, a toilet may not have a neck with a shape conducive to engaging the neck from around the neck. Alternatively, if the seat has not been removed from the toilet, then the seat holes on the neck of the toilet are not readily available without having to first remove the toilet seat. As another example, some toilets may not have any seat holes on the neck of the toilet. In such cases, the coupling adaptor can be utilized to couple to the neck of the toilet so that the device can properly engage the neck of the toilet via the coupling adaptor. The coupling adaptor can also be utilized even when the neck is readily available.

In one embodiment, the coupling adaptor can include a body having one or more connection elements that enable the device to couple to the coupling adaptor. For example, the body can include one or more holes that the contact surface can insert into in order to engage with the coupling adaptor. In such case, the body can include one or more spacing elements that provide space for the engaging member to fit between the body of the coupling adaptor and the neck of the toilet.

The coupling adaptor can be made from one or more materials in different embodiments. The coupling adaptor can be made from a material that is sufficient in strength to support the weight of the toilet when moving the toilet. Example materials can include, but are not limited to, one or more metals, metal alloys, polymers, or combination thereof. For example, in one embodiment, the coupling adaptor can be made from a high strength industrial plastic, such as one from the King Starboard® family of plastics made by King Plastic Corporation. In one embodiment, the coupling adaptor can have a protective layer (e.g., rubber coating) over at least a portion of the coupling adaptor that contacts the toilet to prevent scratching, cracking, or chipping the toilet when coupled to the toilet.

The coupling adaptor can include a securing element that securely couples the coupling adaptor to the toilet. A variety of securing elements can be used in different embodiments but should be sufficient in strength to support the weight of the toilet when moving the toilet. The securing elements can include, but are not limited to, one or more straps, ropes, or other fasteners. In one embodiment, the securing element is a strap that secures around the neck, tank, bowl, or combination thereof. The strap can include a buckle that enables the user to tightly fasten the securing element around the toilet.

Adaptor for Stabilizing the Toilet

In certain aspects of the present disclosure, an adaptor can be provided that couples to the device to stabilize the toilet so that the user can let go of the device when moving the toilet. The adaptor can also be referred to herein as the "stabilizing adaptor" for reference purposes. Wall-mounted toilets, for instance, can mount to the wall from the back end of the toilet, as opposed to floor-mounted toilets that can mount to the floor from the bottom of the toilet. When mounted to the wall, the wall-mounted toilets typically extend from the wall and are maintained off the ground (or floor). The front end of the toilet is thus suspended in the air when mounted. The phrase "front end of the toilet" and "back end of the toilet" are not intended to be limited, but rather are used herein for reference purposes to distinguish the two ends of a toilet, such as the wall-mounted end of the toilet from the suspended-end of the toilet. When using the device to move such a toilet to the wall mount, the user can find it difficult to mount the toilet to the wall mount because one hand is holding the device to keep the toilet up and against the wall. The user may not be able to adequately see behind the toilet to accurately align the toilet to the wall mount; and further, may not be able to easily secure (e.g., screw or bolt) the toilet to the mount while holding the device. In such cases, the user can utilize the stabilizing adaptor to prop up the front end of the toilet and stabilize the toilet against the wall so that the user can let go of the device and align or secure the toilet to the wall mount.

The stabilizing adaptor can include an elongated member and a connection unit, which couples the stabilizing adaptor to the device. In one embodiment, the connection unit can couple to one end of the elongated member of the device. For example, the connection unit can include a coupling element that mates with the end cap on the elongated member of the device. In one embodiment, the coupling element is inserted into a hole in the end cap of the device. The connection unit can also include a connector (e.g., collar) that couples to the elongated member and enables the connection unit to displace along the elongated member. The connection unit can include a locking mechanism that enables the connector to displace longitudinally along the elongated member when unlocked or to remain fixed longitudinally when locked. The types of locking mechanisms may vary, as similarly described above for the locking mechanism of the device. It should be appreciated that the previous discussion of the locking mechanism can also apply here, and not all common features and function are repeated here for the sake clarity and brevity. In one embodiment, the locking mechanism can be implemented within, or part of, the connector. In another embodiment, the locking mechanism can be separate from, and couple to, the connector.

The elongated member of the stabilizing adaptor can be configured to extend to the ground to prop up the front end of the toilet when coupled to the device. Once the front end of the toilet is propped up, the user is free to let go of the device. At this point, the user can take a closer look at the wall mount and slightly adjust the toilet to exactly align with the wall mount, or can secure the toilet to the wall mount with both hands. In one embodiment, the stabilizing adaptor can be configured to provide some force to the device to push the toilet towards the wall to maintain the back end of the toilet against the wall mount, which can assist with propping up the front end of the toilet. For example, the elongated member of the stabilizing device may be angled to help push the toilet towards the wall mount to stabilize the toilet when propped up.

The elongated member of the stabilizing adaptor can be made from one or more materials in different embodiments. The elongated member of the stabilizing adaptor can be made from a material that is sufficient in strength to support the weight of the toilet when the front end of the toilet is propped up. Example materials can include, but are not limited to, one or more metals, metal alloys, polymers, or combination thereof. In one embodiment, the elongated member of the stabilizing adaptor can be made from stainless steel.

The shape of the elongated member of the stabilizing adaptor can vary in different embodiments. Example cross-sectional shapes can include, but are not limited to, a circle, oval, square, polygon, or other regular or irregular geometric shape. In one embodiment, the cross-sectional shape is a circle. Example cross-sectional sizes (e.g., diameters or widths) can include, but are not limited to, cross-sectional sizes ranging between ½ in. and 3 in., such as cross-sectional sizes ranging between ¾ in. and 1½ in. In one embodiment, the cross-sectional size of the elongated member is approximately 1 in. in width or diameter. It should be appreciated that the elongated member can have cross-sectional sizes and shapes outside of these exemplary ranges in other embodiments.

In one embodiment, the stabilizing adaptor can include a base that is disposed at one end of the elongated member and which contacts the ground to provide additional stability and or grip when propping up the front end of the toilet. The base can be shaped and sized to provide a wide base for stability. The base can be made from one or more metals, metal alloys, polymers, or combination thereof. In one embodiment, the base is made from high strength industrial plastic, such as one from the King Starboard® family of plastics made by King Plastic Corporation. In one embodiment, the base can be made from a material that provides enhanced grip, such as rubber or other polymeric material.

The length of the elongated member of the stabilizing adaptor can vary in different embodiments. The length of the elongated member of the stabilizing adaptor should be long enough to extend from the device to the ground to adequately prop up the front end of the toilet. The length to adequately prop up the front end of the toilet can vary depending on various factors, such as the height that the toilet sits off the ground and the height of the toilet itself. Example lengths of the elongated member of the stabilizing adaptor can include, but are not limited to, lengths ranging between 10 in. to 40 in., such as lengths ranging between 15 in. and 30 in. In one embodiment, the length of the elongated member of the stabilizing adaptor is between 20 in. and 25 in. It should be appreciated that the length of the elongated member can be outside of these exemplary ranges in other embodiments.

The elongated member of the stabilizing adaptor can include an end cap coupled into the end of the elongated member opposite the end with the base. The end cap can function to prevent the connector of the stabilizing adaptor from coming off the elongated member of the stabilizing adaptor. In another embodiment, end caps can be coupled into both ends of the elongated member with one end cap functioning as the base. Similar to the previously described end caps for the device, the end caps can be made from one or more materials. Example materials can include, but are not limited to, one or more metals, metal alloys, polymers, or combination thereof. In one embodiment, the end cap can be made from rubber or other polymeric material to enhance grip when contacting the ground.

Aspects of device embodiments have been described in varying detail above. Device embodiments will now be described in further detail in terms of the example embodiments shown in the figures. To facilitate explanation, an x-axis, y-axis, and z-axis can be provided in certain figures. It should be appreciated that variations from the example embodiments shown in the figures can be included in other embodiments without compromising the underlying principles of the present disclosure. These variations can include, for instance, the variations described above for the device, the coupling adaptor, and the stabilizing adaptor. For example, variations can include the addition or removal of one or more features of the example embodiment.

Figure 1B:
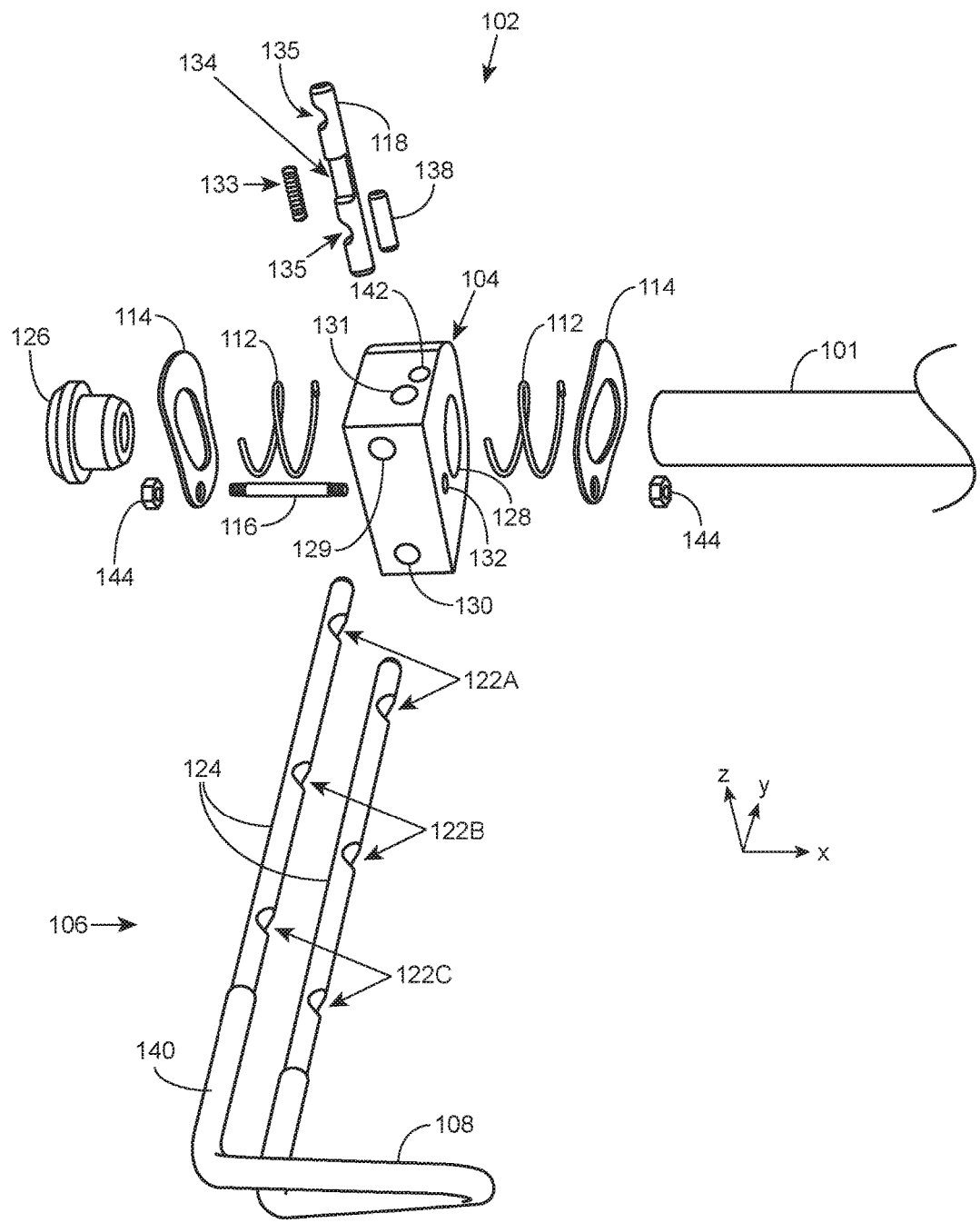
FIG. 1B depicts an exploded bottom perspective view of one end of the device shown in FIG. 1A, according to an embodiment.

FIG. 1A depicts a perspective view of a device for moving a toilet, according to an embodiment. FIG. 1B depicts an exploded bottom perspective view of one end of the device shown in FIG. 1A, according to an embodiment. FIGS. 1A and 1B are described herein together. To facilitate explanation, an x-axis, a y-axis, and a z-axis are provided. The x-axis is used herein to refer generally to the horizontal axis extending from side to side. The y-axis is used herein to refer generally to the vertical axis. The z-axis is used herein to refer generally to the horizontal axis extending from back to front. In FIGS. 1A and 1B, a device 100 is shown including an elongated member 101 and engaging members 102,103 coupled to the elongated member 101. The engaging members 102,103 can include connectors 104,105 coupled to extension elements 106,107, respectively. In the embodiment shown, the connectors 104,105 can be collars and thus may also be referred to herein as "collars 104,105" when describing the example embodiment shown in FIGS. 1A and 1B. The extension elements 106,107 can include contact surfaces 108,109, respectively. The device 100 can also include locking mechanisms 110,111 that can couple to the elongated member 101 and the collars 104,105, respectively. The locking mechanisms 110,111 can include springs 112, 113 and friction washers 114,115, respectively. The locking mechanisms 110,111 can also include retaining rods (not shown in FIG. 1A) that extend through bodies 120,121 of the collars 104,105, respectively. The retaining rod 116 for collar 104 is shown in FIG. 1B. The retaining rod for the collar 105 is not shown in FIG. 1A or 1B, but can be similarly oriented in the collar 105 as the retaining rod 116 is oriented in the collar 104. The collars 104,105 can include locking elements 118,119 that extend through the bodies 120,121 of the collars 104,105 and couple to the extension elements 106,107 to secure the extension elements 106,107 to the collars 104,105, respectively. The collars 104,105 can also include safety elements 138,139 that can serve as a safety feature to prevent the accidental depressing of the locking elements 118,119, respectively. The extension elements 106,107 can also include grooves 122,123 that extend latitudinally across legs 124,125 of the extension elements 106,107, respectively. The grooves 122 are shown further distinguished as grooves 122A, grooves 122B, and grooves 122C in FIG. 1B. The extension elements 106,107 shown can also include rubber coatings (or layers) 140,141 over at least the contact surfaces 108,109, respectively, to prevent scratching, cracking, or chipping the toilet. The device 100 can also include end caps 126,127 coupled to the ends of the elongated member 101.

The elongated member 101 can be coupled to the engaging members 102,103, which are used to engage the toilet to enable the toilet to be moved with the device 100. The elongated member 101 can be used as a handle for the user to hold when moving the toilet. As shown, the device 100 can include end caps 126,127 disposed in opposite ends of the elongated member 101. Each of the end caps 126,127 can be sized and shaped to form a protrusion (or lip) that maintains the collars 104,105 on the elongated member 101, respectively. The end caps 126,127 can be removed if the collars 104,105 need to be removed or placed on the elongated member 101, respectively. In one embodiment, one or both of the end caps 126,127 can be used to couple to a stabilizing adaptor, such as the stabilizing adaptor described herein. For example, the end caps 126,127 can have a hole that is sized and shaped to couple with a corresponding coupling element (e.g., male counterpart) on the stabilizing adaptor.

The engaging members 102,103 can be displaceable along the elongated member 101 in certain instances. The engaging members 102,103 can include the collars 104,105 and the extension elements 106,107, respectively. The collars 104,105 can couple to the elongated member 101 and also to the extension elements 106,107, respectively. The collars 104,105 can displace (e.g., slide) longitudinally along the elongated member 101 when unlocked. The collars 104,105 can be coupled to the elongated member 101 by inserting the elongated member 101 within the collars 104,105, respectively.

As shown, the device 100 can also include the locking mechanisms 110,111 that couple to the respective collars 104,105 and the elongated member 101. When in the locked mode, the locking mechanisms 110,111 can enable the respective collars 104,105 to be fixed longitudinally along the elongated member 101. When in an unlocked mode, the locking mechanisms 110,111 enable the respective collars 104,105 to displace longitudinally along the elongated member 101. The locking mechanisms 110,111 coupled to the collars 104,105 can be separate components from the collars 104,105 and couple thereto (such as shown in FIGS. 1A and 1B), or alternatively in another embodiment, can be integrated within the collars 104,105, respectively. The locking mechanisms 110,111 shown can include the springs 112,113, the friction washers 114,115, the retaining rods 116,117, and nuts 144,145 that secure to the retaining rods 116,117, respectively. For the sake of clarity and brevity, only the configuration of the locking mechanism 110 including the springs 112, the friction washers 114, and the retaining rod 116 with respect to collar 104 is described here. It should be appreciated that the description can also apply to the configuration of the locking mechanism 111 including the springs 113, the friction washers 115, and the retaining rod (not shown) with respect to collar 105.

For the locking mechanism 110, the springs 112 can be disposed on the elongated member 101 with one spring disposed on each side of the collar 104, between the collar 104 and the friction washers 114. The diameters of the springs 112 can be sized to slide along the elongated member 101. The friction washers 114 can include two friction washers—one friction washer disposed on the outside of each of the springs 112. The diameters of each of the friction washers 114 can be sized slightly larger than the elongated member 101 such that the friction washers 114 can slide over and along the elongated member 101. The retaining rod 116 can extend through the collar 104 and can be coupled to (e.g., screwed to, bolted to, or otherwise fastened to) each of the friction washers 114. In this way, the friction washers 114, the springs 112, and the collar 104 can be held together by the retaining rod 116. The retaining rod 116 can be coupled to each of the friction washers 114 such that the springs 112 are under a compressive force. The springs 112 can provide force (or pressure) against the friction washers 114 to orient the friction washers 114 at an angled orientation (e.g., a general V-shape) that presses the friction washers 114 against the elongated member 101. The friction washers 114 can be forced against the elongated member 101 to generate the necessary friction to prevent the collar 104 from displacing longitudinally along the elongated member 101. This can bias the locking mechanism 110 in the locked mode. To put the locking mechanism 110 in the unlocked mode, the user can press the friction washers 114 towards one another, which further compresses the springs 112. When the frictions washers 114 are pressed towards one another, the friction washers 114 can be oriented such that the areas of the holes in the friction washer 114 are sufficiently increased to reduce the applied friction and enable the elongated member 101 to slide within the holes of the friction washers 114. At this time, the collar 104 can displace longitudinally along the elongated member 101. When the user stops pressing the friction washers 114 towards one another, the locking mechanism 110 can again enter the locked mode.

As shown, the extension elements 106,107 can removably couple to the respective collars 104,105 and can extend radially away from the elongated member 101. The extension elements 106,107 can be inserted into the collars 104,105 and can become securely coupled to the collars 104,105 when properly inserted, respectively. The extension elements 106,107 can include the respective contact surfaces 108,109 that are used to engage the toilet directly or via the coupling adaptor. The contact surfaces 108,109 are disposed on the respective extension elements 106,107 such that they are distal to the elongated member 101. The contact surfaces 108,109 can be oriented to face in a direction towards the elongated member 101, as opposed to a direction away from the elongated member 101. In the embodiment shown, the contact surfaces 108,109 can be approximately parallel to the elongated member 101, with the contact surfaces 108, 109 extending inward and becoming slightly closer to the elongated member 101 as they extend inward.

The extension elements 106,107 shown can be shackles. In one embodiment, the shackles can be bent at approximately 90 degrees to form platforms that functions as the respective contact surfaces 108,109, which are approximately parallel to the elongated member 101. Each of the extension elements 106,107 can be bent according to the area and manner in which the respective extension elements 106,107, and further, can be bent in a size and shape to be well suited to engage the toilet in the desired area and manner. For example, the extension elements 106,107 can be bent to have a size and shape well suited to securely engage with the neck of the bowl from around the neck of the bowl. The extension elements 106,107 can have the respective rubber coatings 140,141 disposed over the respective contact surfaces 108,109 and partially up the respective legs 124,125 to prevent scratching, cracking, or chipping the toilet when engaging the toilet.

The extension elements 106,107 can include the grooves 122,123 that extend latitudinally across the legs 124,125 of the extension elements 106,107, respectively. The grooves 122,123 can have a curved shape that matches the arc of the locking element 118. The grooves 122,123 can be configured to work in conjunction with the locking elements 118,119 to secure the extension elements 106,107 to the collars 104,105 when the locking elements 118,119 are in a locked mode (or open position), respectively. The grooves 122,123 can also be configured to work in conjunction with the locking elements 118,119 to become unsecured when the locking elements 118,119 are in an unlocked mode (or closed position), respectively. Further details regarding an extension element becoming secured and unsecured (or locked and unlocked) by the locking element are provided below when further describing the locking element.

The grooves 122,123 can be disposed at specific areas on the extension elements 106,107 to enable the grooves 122, 123 to only secure to the collars 104,105 when properly oriented, respectively. In the embodiment shown, the grooves 122 can be disposed on the same side of the legs 124 than the side in which the contact surface 108 extends. Since the locking element 118 can be disposed to one side of the extension through-holes 129,130 of the collar 104, the extension element 106 can only secure to the collar 104 with the contact surface 108 extending inward. However, the grooves 123 can be disposed on the opposite side of the legs 125 than the side in which the contact surface 109 extends. Since the locking element 119 can be disposed to one side of the extension through-holes (not shown with reference numbers in FIGS. 1A and 1B) of the collar 105, the extension element 107 can only secure within the extension through-holes of the collar 105 with the contact surface 109 extending inward. This feature can ensure that the extension elements 106,107 are properly inserted and locked in the proper orientation.

Figure 2A:
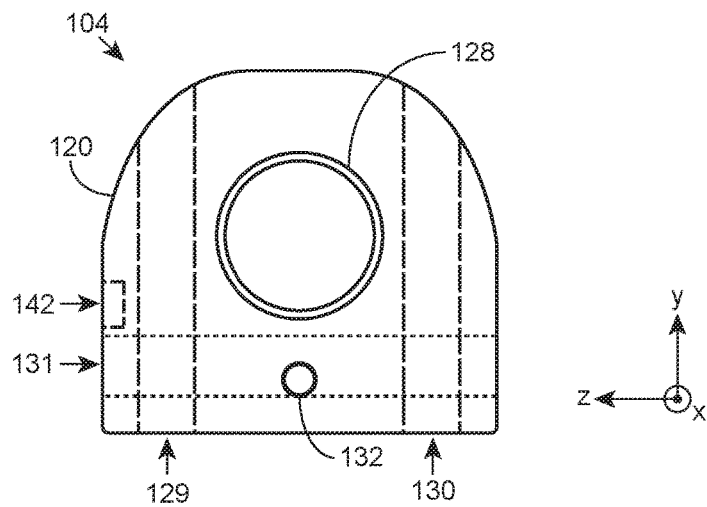
FIG. 2A depicts a front view of a collar shown in FIGS. 1A and 1B, according to an embodiment.
Figure 2B:
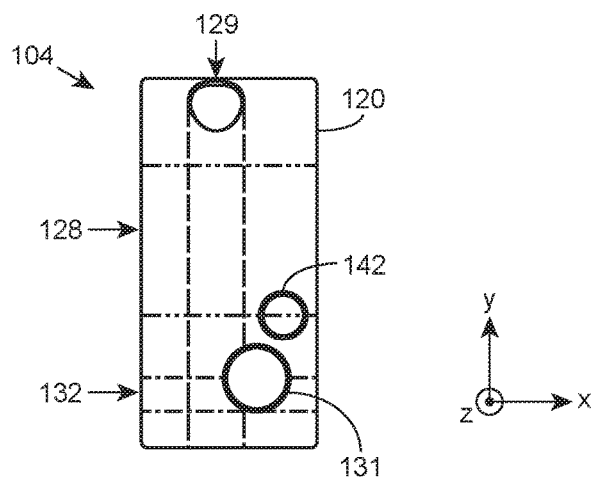
FIG. 2B depicts a side view of the collar shown in FIG. 2A, according to an embodiment.
Figure 2C:
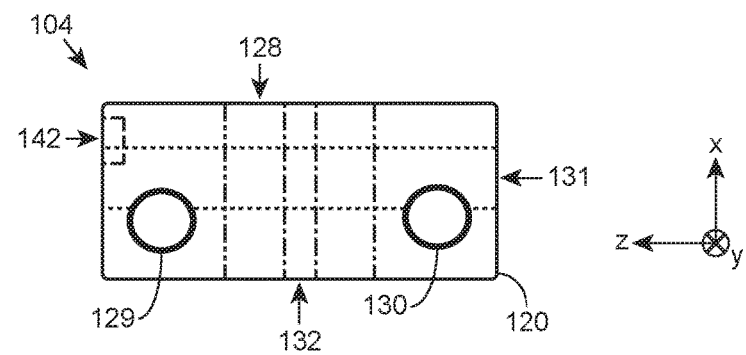
FIG. 2C depicts a bottom view of the collar shown in FIG. 2A, according to an embodiment.

FIG. 2A depicts a front view of the collar 104 shown in FIGS. 1A and 1B, according to an embodiment. FIG. 2B depicts a side view of the collar 104 shown in FIG. 2A, according to an embodiment. FIG. 2C depicts a bottom view of the collar 104 shown in FIG. 2A, according to an embodiment. The description of FIGS. 2A, 2B, and 2C are provided together herein along with the continuing descriptions of FIGS. 1A and 1B. It should be appreciated that the description of the collar 104 in FIGS. 1A, 1B, 2A, 2B and 2C can similarly apply to the collar 105 shown in FIGS. 1A and 1B. For the sake of clarity and brevity, the common features and functions for the collar 105 are not repeated here.

As shown, the collar 104 can include the body 120 having five through-holes 128,129,130,131,132 and one hole 142. For the reference purposes, the through-holes 128,129,130, 131,132 and the hole 142 can be shown as dotted lines in FIGS. 2A, 2B, and 2C when not visible in the corresponding figure. The through-hole 128 (also referred to herein as the "main through-hole 128" for reference purposes) can be configured to receive the elongated member 101 and extend along the reference x-axis. The main through-hole 128 can be disposed generally in the middle of the main body 120. The main through-hole 128 can enable the collar 104 to be placed on an end of the elongated member 101 and to displace longitudinally along the elongated member 101. The through-holes 129,130 (also referred to herein as "extension through-holes 129,130" for reference purposes) can be configured to receive each leg of an extension element, such as each of the legs 124 of the extension element 106. The extension through-holes 129,130 can extend along the reference y-axis, with each of the through-holes 129,130 disposed on opposite sides of the main through-hole 128. The through-hole 131 (also referred to herein as "locking through-hole 131" for reference purposes) can be configured to receive the locking element 118 and enable the locking element 118 to displace longitudinally therein. The locking through-hole 131 can extend along the reference z-axis under the main through-hole 128. The locking through-hole 131 can be disposed in the body 120 such that it intersects a portion of each of the extension through-holes 129,130. The through-hole 132 (also referred to herein as "retaining through-hole 132" for reference purposes) can be configured to receive the retaining rod 116 that can couple the two friction washers 114. The retaining through-hole 132 can extend along the reference x-axis under the main through-hole 128. The hole 142 (also referred to herein as the "safety hole 142" for reference purposes) can be disposed adjacent to the locking through-hole 131. The safety element 138 can be disposed in the hole 142 and can protrude from the body 120 of the collar 104.

The locking element 118 can be configured to enter the locked mode and the unlocked mode. When in the locked mode, the locking element 118 can work in conjunction with the grooves 122 of the extension element 106 (or with one of the grooves disposed on another extension element described herein) to secure the extension element 106 to the collar 104 so that the extension element 106 can be prevented from displacing longitudinally within the extension through-holes 129,130 of the collar 104. When in the unlocked mode, the locking element 118 can enable the extension element 106 to become unsecured such that the extension element 106 can displace longitudinally within the extension through-holes 129,130. The phrase "displacing longitudinally within the extension through-hole" or "displace longitudinally within the extension through-hole" is used herein to refer to displacing the extension element in either direction along the longitudinal axis of the extension through-hole, wherein the longitudinal axis extends from end to end of the extension through-hole. In one embodiment, an extension element can rotate when secured to the collar and can be prevented from displacing longitudinally within the collar. For example, an extension element can have a single leg with the grooves extending completely around the leg to enable the extension element to rotate about the axis of the leg. In another embodiment, the extension element can have a single leg with the grooves extending partially around the leg to enable the extension element to rotate partially about the axis of the leg.

The locking element 118 can be configured as a lever that slides between the locked mode and the unlocked mode (or a sliding locking lever). The locking element 118 can extend through the body 120 of the collar 104. The locking element 118 can be spring-loaded by a spring 133 (or a locking lever spring) to protrude out of the body 120 and can bias the locking element in the locked mode. The locking element 118 can be configured to enter the unlocked mode while the user depresses the protruded portion of the locking element 118 into the body 120 of the collar 104. At this time, the user can insert the extension element 106 (or another extension element described herein) within the extension through-holes 129,130 or displace the extension element longitudinally within the extension through-holes 129,130. The locking element 118 can be configured to enter the locked mode when the user releases the locking element 118 and the grooves of the extension element 106 properly align with the locking element 118. To remove the extension element 106 from the collar 104, the user can depress the locking element 118 and pull the extension element 106 out of the extension through-holes 129,130 of the collar 104. The collar 104 can include the safety element 138 that can protrude from the body 120 of the collar 104. The safety element 138 can be configured to not depress, but rather remain rigid or fixed. Since the safety element 138 can be adjacent to the protruded portion of the locking element 118 and not configured to depress, the safety element 138 can serve as a safety feature to prevent the user from accidentally depressing the locking element 118.

As shown in FIG. 1B, the spring 133 can be disposed within a notch 134 (or grooved slot) in the locking element 118. The retaining through-hole 132 can intersect the locking through-hole 131 such that the retaining rod 116 can be disposed within the notch 134 when inserted into the retaining through-hole 132. The spring 133 can be maintained under a compressive load between the retaining rod 116 and the end of the notch 134. In this way, the force from the spring 133 can bias the locking element 118 in the locked mode with the locking element 118 protruding out of the body 120 of the collar 104.

The locking element 118 can be disposed in the locking through-hole 131 and can intersect a portion of the extension through-holes 129,130. The locking element 118 can be configured to obstruct a portion of the extension through-holes 129,130 when in the locked mode. As a result, the extension element 106 can be prevented from being completely inserted into the extension through-holes 129,130 when in the locked mode. Furthermore, the locking element 118 can include grooves 135 that that can enable the locking element 118 to not obstruct the extension through-holes 129,130. The grooves 135 can extend latitudinally across the locking element 118. The grooves 135 can have a curved shaped and size that matches the arc of the extension through-holes 129,130. When the user depresses the locking element 118 to activate the unlocked mode, the grooves 135 can become aligned with the extension through-holes 129, 130 so that the extension through-holes 129,130 can no longer be obstructed by the locking element 118. In this way, the extension element 106 can be inserted into the extension through-holes 129,130 or can be displaced longitudinally within the extension through-holes 129,130. Once the extension element 106 is inserted into the extension through-holes 129,130, the locking element 118 can remain in the unlocked mode as long as the user is depressing the locking element 118. If the user releases the locking element 118, the locking element 118 can remain in the unlocked mode as long as the locking element 118 abuts an un-grooved portion of the extension element 106. If the extension element 106 can be displaced longitudinally within the extension through-holes 129,130 so that the grooves on the extension element become adjacent to the locking element 119, then the force from the compressed spring 133 can push the locking element 118 back into the locked mode. At this point, the locking element 118 can be disposed within the grooves 122 of the extension element 106, which can secure the extension element 106 to the collar 104 (or also referred to herein as "secured within the extension through-holes 129,130"). In order to avoid the locking element 118 from being automatically pushed back to the locked mode when adjacent to one or more undesired grooves on the extension element, the user can continue to depress the locking element 118 until the undesired grooves are passed.

In certain aspects of the present disclosure, a device for moving a toilet can be configured with various extension elements. For example, in one embodiment, the device 100 can be configured with extension elements other than the extension elements 106,107 shown in FIGS. 1A and 1B. Extension elements having different characteristics can provide different features or functions to the device. For example, the characteristics of the extension element, such as the size and shape of the extension element, can enable the extension element to be well suited to stably engage the toilet in various areas and manners. For example, depending on the shape and size of the extension element, the extension element can be well suited to stably engage the rim of the bowl, the exterior of the bowl from around the bowl, the neck of the toilet from around the neck, the neck of the toilet through a seat hole, or the neck of the toilet via a coupling adaptor coupled to the neck of the toilet. In one embodiment, the device can include two different types of extension elements that engage the toilet in different areas and manners. For example, one extension element can engage the rim of the toilet while the other extension element engages the neck of the toilet, either directly or via the coupling adaptor.

In one embodiment, the extension elements can be removably coupled to the device. For example, in the embodiment shown in FIGS. 1A and 1B, the extension elements 106,107 can be removably coupled from the respective collars 104, 105 of the device 100. Once removed, other types of extension elements having different characteristics can be attached or removed as needed to engage the toilet in a combination of different desired areas and manners. The following paragraphs describe various extension elements having characteristics (e.g., shape and size) that can be well suited for stably engaging the toilet in different areas and manners. These example characteristics are provided for illustrative purposes and it should be appreciated that other variations can be provided in other embodiments without compromising the underlying principles of the present disclosure. It should be appreciated that while a specific extension element can have characteristics that are well suited for engaging the toilet in a specific area and manner, the given extension element can also, in some instance, be used to engage the toilet in another area or manner. It should also be appreciated that the previous description for extension elements can also apply here, such as how the extension element can couple to the device. For the sake of clarity and brevity, not all of the common features and functions are again repeated here. It should also be appreciated that the extension elements described herein, such as shown in FIGS. 3-5, are example embodiments and that other variations are possible in other embodiments.

In certain aspects, an extension element can be provided that has characteristics that can be well suited for stably engaging the neck of the toilet bowl from around the neck. In one embodiment, an example characteristic that can be well suited to stably engage the neck of the toilet from around the neck can include, but is not limited to, a tapered contact surface that can be positioned around a seat bolt protruding from the underside of the neck of the toilet. FIG. 3 depicts a perspective view of the extension element 106 shown in FIGS. 1A and 1B, according to an embodiment. As shown in FIG. 3, the extension element 106 can be bent to form the contact surface 108 that engages the neck of the toilet from around the neck. The contact surface 108 can include sides 136,137 and can be disposed distal to the elongated member 101 when coupled to the collar 104 of the device 100. The contact surface 108 can have a length L1 that can enable the contact surface 108 to extend under the neck of the toilet from around the neck of the toilet. In the embodiment shown, a width W1 of the contact surface 108 can taper (or narrow) as it gets further from the legs 124. When engaging the neck of the toilet, the narrowing width W1 of the contact surface 108 can enable the contact surface 108 to securely fit around a seat bolt protruding from the underside of the neck of the toilet. Having a secure fit around the seat bolt can provide additional stability.

The legs 124 of the extension element 106 can include the grooves 122 disposed on the same side of the legs 124 from which the contact surface 108 extends. The grooves 122 are shown further distinguished in FIG. 3 as the grooves 122A, the grooves 122B, and the grooves 122C. The grooves 122 can be aligned with the locking element 118 to enable the extension element 106 to become secured to the collar 104 to prevent the extension element 106 from displacing longitudinally in the extension through-holes 129,130. The grooves 122A,122B,122C can be disposed on the legs 124 at various heights (or distances along the leg) to enable the extension element 106 to secure to the collar 104 at different positions, with each position corresponding to the contact surface 108 being maintained at a different distal distance to the elongated member 101. In this way, the user can adjust the distal distance that the contact surface 108 is from the elongated member 101. Furthermore, the grooves 122 can be disposed on the same side of the legs 124 than the side in which the contact surface 108 extends from. In this way, the extension element 106 will only secure within the extension through-holes 129,130 of the collar 104 with the contact surface 108 extending inward. The extension element 106 can be the same as the extension element 107, except the grooves 122 on the legs 124 of the extension element 106 can be on opposite sides than the grooves 123 on the legs 125 on the extension element 107. This features can serve to ensure that the extension elements 106,107 are inserted in the proper orientation, such as with both of the contact surfaces 108,109 extending inward to engage the neck of the toilet from around the neck for instance.

In one embodiment, the extension element 106 can be configured to engage the exterior of the toilet bowl from around the toilet bowl. The extension element 106 can be the same or similar to the extension element 106 that engages the neck of the toilet from around the neck, except that the legs 124 of the extension element 106 can be longer to reach the exterior of the toilet bowl. Example lengths of the extension element 106 that couples to the exterior of the bowl can include, but are not limited to, lengths ranging between 8 in. to 35 in., such as 10 in. to 25 in. In one embodiment, the lengths range from 12 in. to 20 in. It should be appreciated that the lengths of the extension element can be outside of these exemplary ranges in other embodiments. In one embodiment, the extension element 106 for engaging the exterior of the toilet bowl from around the toilet bowl can have a larger contact surface 108 than the extension element 106 engages the neck of the toilet from around the neck.

In certain aspects of the present disclosure, an extension element can be provided that has characteristics that can be well suited for stably engaging the rim of a toilet bowl. In one embodiment, example characteristics that can be well suited to stably engage the rim of the toilet bowl can include, but are not limited to, a contact surface that broadens in width to provide a wider base to engage the rim of the toilet, and a contact surface having a length that is generally the approximate width of the rim of the toilet. FIG. 4 depicts a perspective view of an extension element, according to an embodiment. As shown, an extension element 406 can be a shackle having a contact surface 408 and two legs 424. The extension element 406 can be bent at approximately 90-degrees to form the contact surface 408 that engages the toilet. The extension element 406 can be configured to removably couple to the collar 104 of the device 100. The extension element 406 can extend radially away from the elongated member 101 when coupled to the device 100. For example, the extension element 406 can be inserted into the extension through-holes 129,130 of the collar 104 and can become secured to the collar 104 when properly oriented.

The contact surface 408 can include sides 436,437,438 and can be disposed distal to the elongated member 101 when coupled to the elongated member 101. The contact surface 408 can be oriented to face in a direction towards the elongated member 101, as opposed to a direction away from the elongated member 101. In the embodiment shown, the contact surface 408 can be approximately parallel to the elongated member 101. The extension element 406 can have a rubber coating 440 over at least the contact surface 408 to prevent scratching, cracking, or chipping the toilet when engaging the toilet. As shown, the width of the contact surface 408 can become wider the further away the contact surface 408 extends from the legs 424. In this way, the contact surface 408 can broaden to provide a wider base to engage the rim of the toilet. For example, the side 438 can provide the widest width, W2, of the contact surface 408 and can broaden the base greater than the width W3 at the two legs 424. Having a wider base to engage the rim of the toilet can provide additional stability. Furthermore, the length L2 that the contact surface 408 extends away from the legs 424 can generally be the approximate width of the rim of the toilet. In this way, when the contact surface 408 is engaged with the rim of the toilet, the legs 424 can be maintained close to the edge of the rim of the toilet. This can also contribute to extra stability.

The extension element 406 can include grooves 422 that extend latitudinally across the legs 424 of the extension element 406. The grooves 422 can be disposed on the opposite side of the legs 424 from which the contact surface 408 extends. The grooves 422 are shown further distinguished in FIG. 4 as grooves 422A, grooves 422B, and grooves 422C. The grooves 422 can have a curved shape that matches the arc of the locking element 118 that intersects the extension through-holes 129,130. The grooves 422 can be configured to work in conjunction with the locking elements 118 to secure the extension element 406 to the collar 104 when the locking element 118 is in the locked mode. The grooves 422 can be aligned with the locking element 118 to enable the extension element 406 to secure to the collar 104 to prevent the extension element 406 from displacing longitudinally within the extension through-holes 129,130. The grooves 422A,422B,422C are disposed on the legs 424 at various heights to enable the extension element 406 to secure in the extension through-holes 129,130 at different positions, with each position corresponding to the contact surface 408 being maintained at a different distal distance to the elongated member 101. In this way, the user can adjust the distal distance that the contact surface 408 is from the elongated member 101. Furthermore, the grooves 422 can be disposed on the opposite side of the legs 424 than the side in which the contact surface 408 extends from. In this way, the extension element 406 can only secure to the collar 104 with the contact surface 408 extending outward. The extension element that can be coupled to collar 105 can be the same as the extension element 406, except with the grooves on same sides of the legs than shown for the extension element 406. This feature can serve to ensure that the extension elements are inserted in the proper orientation, such as with both of the contact surfaces extending outward to engage the rim of the toilet for instance.

In certain aspects of the present disclosure, an extension element can be provided that has characteristics that can be well suited for stably engaging the neck of the toilet through a seat hole in the neck. In one embodiment, an example characteristic that can be well suited to stably engage the neck of the toilet through the seat hole can include, but is not limited to, a contact surface having a narrow width to enable insertion of the contact surface into the seat hole in the neck of the toilet. FIG. 5 depicts a perspective view of an extension element, according to an embodiment. As shown, an extension element 506 can include a contact surface 508 and a leg 524. The extension element 506 can be a generally L-shaped shackle that is bent at approximately 90-degrees to form the contact surface 508 that engages the toilet. The extension element 506 can be configured to removably couple to the collar 104 of the device 100. The extension element 506 can extend radially away from the elongated member 101 when coupled to the device 100. The extension element 506 can be inserted into either of the extension through-holes 129,130 of the collar 104 to become secured to the collar 104. For sake of clarity and brevity, the description here will refer to the extension through-hole 129 as the extension through-hole selected to receive the leg 524.

The contact surface 508 can be disposed distal to the elongated member 101 when coupled to the elongated member 101. The contact surface 508 can be oriented to face in a direction towards the elongated member 101, as opposed to a direction away from the elongated member 101. In the embodiment shown, the contact surface 508 can be approximately parallel to the elongated member 101 when coupled. The extension element 506 can have a rubber coating 540 over at least the contact surface 508 to prevent scratching, cracking, or chipping the toilet when engaging the toilet. The contact surface 508 can have a width W4 that enables insertion of the contact surface 508 into the seat hole in the neck of the toilet. The contact surface 508 can have a length L3 that is sufficient in length to stably engage the neck, but which does not prevent insertion of the contact surface 508 through the seat hole. The length L3 of the contact surface 508 and the bend in the extension element 506 can provide stability and help to prevent the extension element 506 from being removed accidently from the seat hole.

As shown, the extension element 506 can include grooves 522 that extend latitudinally across, and completely around, the leg 524 of the extension element 506. The grooves 522 are shown further distinguished in FIG. 5 as grooves 522A and grooves 522B. The grooves 522 can have a curved shape that matches the arc of the locking element 118 that intersects the extension through-holes 129,130. The grooves 522 can be configured to work in conjunction with the locking elements 118 to secure the legs 524 of the extension element 506 to the collar 104 when the locking element 118 is in the locked mode. The grooves 522 can align with the locking element 118 to enable the extension element 506 to secure to the collar 104 to prevent the extension element 506 from displacing longitudinally in the extension through-hole 129. The grooves 522A,522B can be disposed on the leg 524 at various heights to enable the extension element 506 to secure in the extension through-hole 129 at different positions, with each position corresponding to the contact surface 508 being maintained at a different distal distances to the elongated member 101. In this way, the user can adjust the distal distance that the contact surface 508 is from the elongated member 101. Because the grooves 522 can extend completely around the leg, the extension element 508 can become secured to the collar 104 when inserted into the extension through-hole 129 with any rotational orientation of the contact surface 508. Furthermore, the extension element 508 can rotate (or spin) when locked longitudinally within the extension through-hole 129. The ability of the extension element 508 to rotate when locked can enable the user to rotate the contact surface 508 to extend in any direction (e.g., inward, outward, or other direction) under the neck of the toilet once engaged. For example, the user can rotate the contact surface 508 to extend in a direction that provides extra stability. The extension element that can be coupled to the collar 105 can be the same as the extension element 506.

Figure 6A:
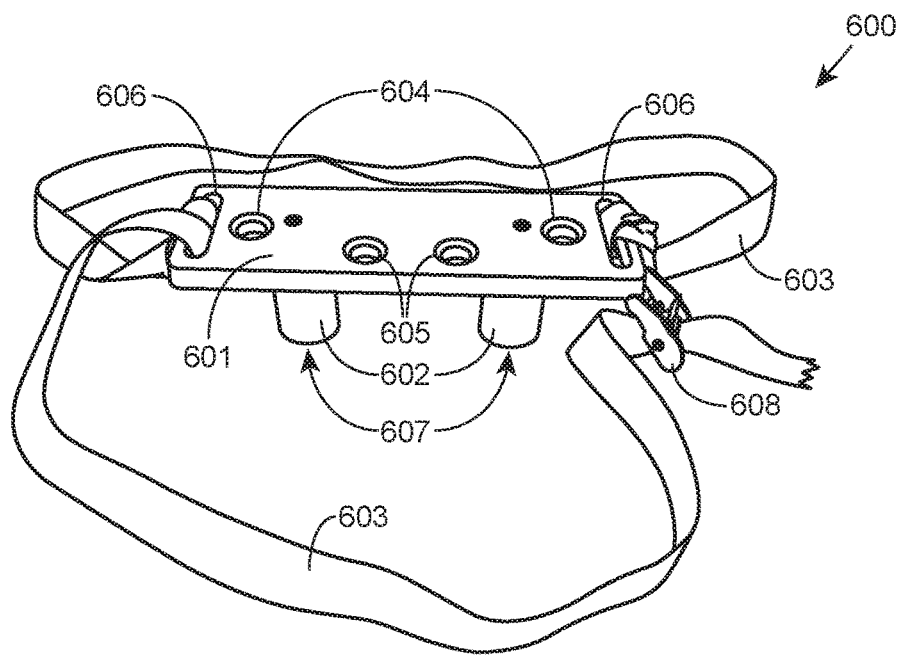
FIG. 6A depicts a front perspective view of a coupling adaptor, according to an embodiment.
Figure 6B:
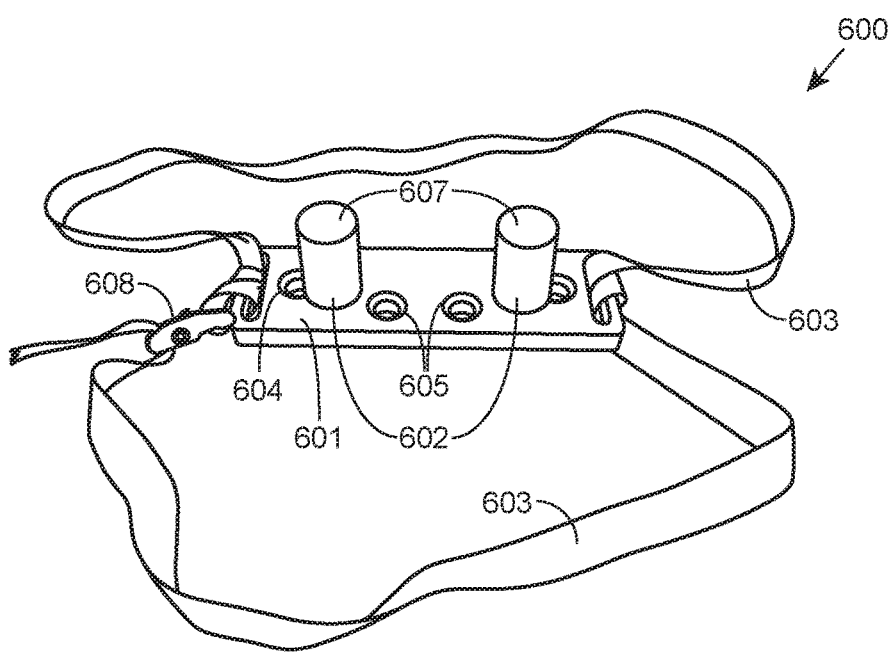
FIG. 6B depicts a bottom perspective view of the coupling adaptor shown in FIG. 6A, according to an embodiment.

In certain aspects of the present disclosure, a coupling adaptor can be provided that can enable a device for moving a toilet to couple to the neck of the toilet via the coupling adaptor. For example, the coupling adaptor can be coupled to the neck of the toilet, and thereafter, the device can be coupled to holes in the coupling adaptor. The coupling adaptor can be useful in various instances, such as when the seat of the toilet has not been removed to expose the seat holes on the neck of the toilet, when a toilet does not have seat holes on the neck of the toilet, etc. In one embodiment, the device 100 shown in FIGS. 1A and 1B can be configured with removable extension elements. In this way, the device 100 can be coupled to extension elements that work in conjunction with the coupling adaptor 600. FIG. 6A depicts a front perspective view of a coupling adaptor, according to an embodiment. FIG. 6B depicts a bottom view of the coupling adaptor shown in FIG. 6A, according to an embodiment. The description of FIGS. 6A and 6B are provided herein together. As shown, a coupling adaptor 600 can include a body 601, spacing elements 602 coupled to the body 601, and a securing element 603 coupled to the body 601. The body 601 can include holes (or openings) 604,605, 606. The spacing elements 602 can be coupled to the body 601 of the coupling adaptor 600 and can extend away from the body 601. The ends 607 of the spacing elements 602 can be disposed on the neck of the toilet when coupled to the toilet. When the ends 607 are disposed on the neck of the toilet, the spacing elements 602 can provide a space (or gap) between the neck of the toilet and the body 601. The body 601 can include holes 604,605 that can serve as connection elements for the extension element 506 to couple to. The holes 604,605 can vary in size, but should be sufficient in size to receive the extension element 506 and enable the contact surface 508 to be oriented under the body 601.

The securing element 603 shown can be a strap (e.g., rope or other fastener) that can secure the coupling adaptor 600 to the toilet. The securing element 603 can couple to the holes 606 of the body 601 of the coupling adaptor 600. The securing element 603 can be securely fastened around one or more areas of the toilet (e.g., around the bowl, tank, neck, or combination thereof). In one embodiment, the securing element 603 can be configured in two loops—one loop to fasten around the tank of the toilet, and another loop to fasten around the lower exterior of the toilet bowl. The securing element 603 can include a buckle 608 that enables the user to fasten the securing element 603 to the toilet. In another embodiment, the securing element 603 can securely fastened around the neck of the toilet. In yet another embodiment, the securing element 603 can be securely fastened around the neck as well as other areas of the toilet, such as the tank, lower exterior of the bowl, or both.

In one example configuration, two of the extension elements 506 shown in FIG. 5 can be coupled to the device (e.g., the device 100 shown in FIGS. 1A and 1B) with one extension element coupled to one of the extension through-holes of the collar 104 and the other extension element coupled to one of the extension through-holes of the collar 105. The extension through-holes on the same side of the collars 104,105 can be used to provide extra stability. The collars 104,105 can then be displaced along the elongated member 101 in order to align the two extension elements 506 with the holes 604. The bent ends of the two extension elements 506 can then be inserted into the holes 604 until the contact surfaces 508 are completely inserted through the holes 604. Once the contact surfaces 508 are inserted through the holes 604, the device can be rotated about the axis of the coupling adaptor 600 until the contact surfaces 508 are parallel with the body 601 of the coupling adaptor 600. In this way, the contact surfaces 508 on the extension elements 506 can engage the underside of the body 601. The user can then rotate the contact surfaces 508 to extend in directions that provide extra stability, such as in opposite directions from one another.

In another example configuration, two of the extension elements 506 can be coupled to the device, with both coupled to the extension through-holes 129,130 of one collar, such as the collar 104. The holes 605 of the coupling adaptor 600 can be spaced at a distance that aligns with the extension through-holes 129,130. The collar 104 can be displaced along the elongated member 101 as needed to orient the collar 104 near the holes 605. The contact surfaces 508 of the two extension elements 506 can then be inserted into the holes 605 until the contact surfaces 508 are completely inserted through the holes 605. Once the contact surfaces 508 are inserted through the holes 605, the device can be rotated about the axis of the coupling adaptor 600 until the contact surfaces 508 are parallel with the body 601 of the coupling adaptor 600. In this way, the contact surfaces 508 on the extension elements 506 can stably engage the body 601. The user can then rotate the contact surfaces 508 to extend in directions that provide extra stability, such as in opposite directions from one another. The user can couple a different extension element to the other collar 105, such as the extension element 406 for instance. In this way, the collar 105 can be displaced to stably engage the contact surface 408 of the extension element 406 to the rim of the toilet. The user can then use the device to move the toilet. In yet another configuration, the device can be coupled to the coupling adaptor 600 in a similar manner as described except that only one extension element 506 is coupled to only one of the extension through-holes 129,130 of the collar 104 and inserted through only one of the holes 605. It should be appreciated that the coupling adaptor 600 can include variations in the placement of the holes 604,605 and may include more or less holes in other embodiments.

Figure 7:
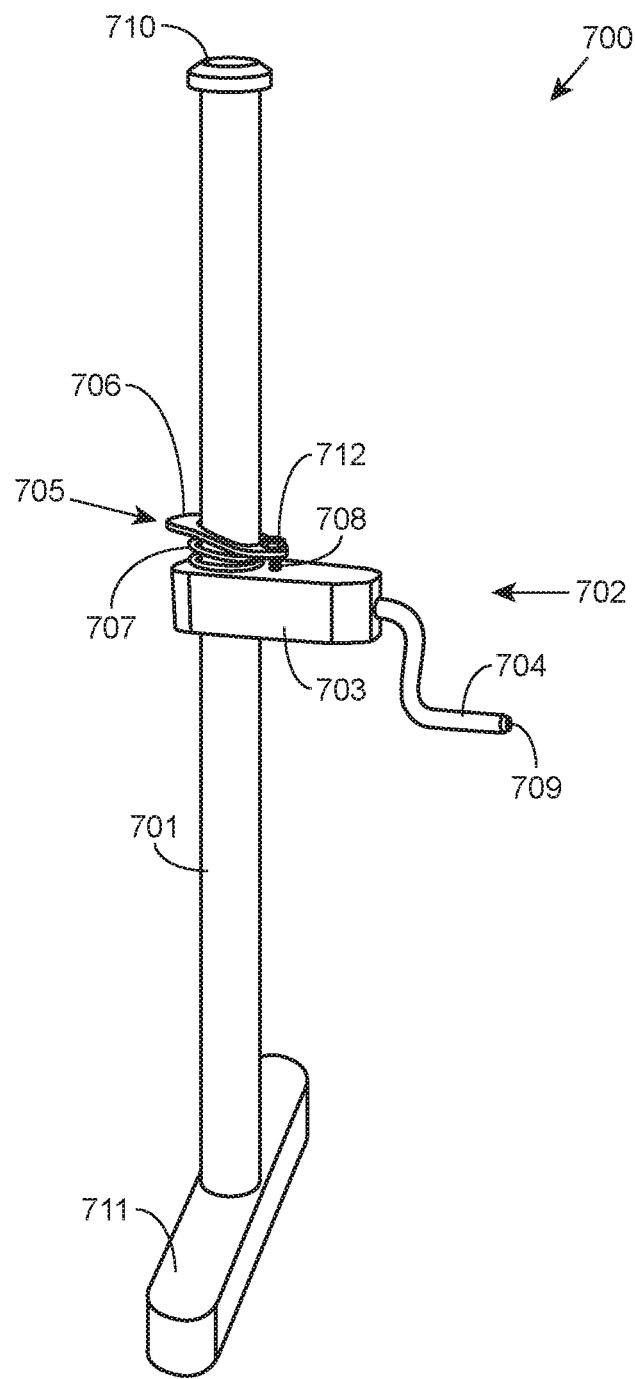
FIG. 7 depicts a perspective view of a stabilizing adaptor, according to an embodiment.

In certain aspects of the present disclosure, an adaptor can be provided that can couple to a device for moving a toilet (e.g., the device 100 shown in FIGS. 1A and 1B) to provide stability to the toilet. The adaptor can be useful in various instances, such as when mounting a toilet to a wall mount. For example, some toilets can be configured to sit off the ground and mount to the wall, as opposed to the floor. When using the device to mount the toilet to the wall mount, the user can find it difficult to hold the toilet up with one hand and connect the toilet to the wall mount with the free hand. For instance, the user may not be able to adequately see behind the toilet to properly align the toilet to the wall mount, or to easily screw the toilet to the wall mount while holding the toilet against the wall mount. FIG. 7 depicts a front perspective view of a stabilizing adaptor, according to an embodiment. The common components (e.g., elongated member, collars, and components thereof) may be referred to using the same reference numbers as previously identified in FIGS. 1A and 1B. As shown, a stabilizing adaptor 700 can include an elongated member 701 and connection unit 702. The connection unit 702 can be coupled to the elongated member 701 and can removably couple to a device for moving a toilet, such as the device 100 shown in FIGS. 1A and 1B. The connection unit 702 can include a collar 703, a coupling element 704 coupled to the collar 703, and a locking mechanism 705 coupled to the collar 703. The collar 703 can include a through-hole (not shown) that receives the elongated member 701. The collar 703 can include a hole (not shown), inside of which the coupling element 704 is disposed. The collar 703 can include a through-hole (not shown) that receives a retaining rod 708 that can couple the locking mechanism 705 to the collar 703.

The coupling element 704 can be configured to removably couple to the device for moving a toilet. In FIG. 7, the stabilizing device 700 is not shown coupled to the device for moving a toilet; however, FIG. 14 depicts the stabilizing device 700 coupled to an example device for moving a toilet and the corresponding description for FIG. 14 provides additional details. In one embodiment, the coupling element 704 can be sized and shaped to insert within either of the holes in the end caps 126,127 of the elongated member 101 of the device 100. The coupling element 704 can extend from the collar 703 in a direction generally perpendicular to the elongated member 701. The coupling element 704 shown can include two approximate 90-degree bends, which lowers a height of a coupling end 709 of the coupling element 704 with respect to a height of the collar 703. In this way, when the coupling end 709 is coupled to the device 100, the weight of the toilet can be applied to the stabilizing adaptor 700 in a more stable manner with a lowered center of gravity. Furthermore, the weight of the toilet can pull the top end of the stabilizing adaptor 700 towards the toilet, which can consequently apply a force that pushes the toilet towards the wall mount to stabilize the toilet propped up in the air against the wall mount. The elongated member 701 can also be tilted by the user to further stabilize the toilet against the wall mount.

The collar 703 and the locking mechanism 705 can be disposed on the elongated member 701. When in a locked mode, the locking mechanism 705 can enable the collar 703 (and the connection unit 702 as a whole) to remain fixed longitudinally along the elongated member 701. When in an unlocked mode, the locking mechanism 705 can enable the collar 703 (and the connection unit 702 as a whole) to displace longitudinally along the elongated member 701. The locking mechanism 705 can include a friction washer 706, a spring 707, the retaining rod 708, and a nut 712. The friction washer 706 and the spring 707 can be disposed on the elongated member 701. The spring 707 can be disposed between the friction washer 707 and the collar 703. The retaining rod 708 can be coupled to the friction washer 707 and the collar 703 such that the spring 707 can be under a compressive load. The spring 707 can provide force against the friction washer 706 to orient the friction washer 706 at an angled orientation that presses the friction washer 706 against the elongated member 701. The friction washer 706 can be forced against the elongated member 701 to generate the necessary friction to prevent the collar 703 (and the connection unit 702 as a whole) from displacing longitudinally along the elongated member 701. In this way, the locking mechanism 705 can be biased in the locked mode. To put the locking mechanism 705 in the unlocked mode, the user can press the friction washer 706 towards the collar 703, which further compresses the spring 707. When the friction washer 706 is pressed towards the collar 703, the friction washer 706 can be oriented such that the area of the hole in the friction washer 706 is sufficiently increased to reduce the applied friction and enable the elongated member 701 to slide within the holes of the friction washer 706. At this time, the collar 703 can displace longitudinally along the elongated member 701. When the user stops pressing the friction washer 706 towards the collar 703, the locking mechanism 705 can again enter the locked mode.

The elongated member 701 shown can include an end cap 710 coupled to one end of the elongated member 701. The end cap 710 can be sized and shaped to form a protrusion that maintains the connection unit 702 on the elongated member 701. The end cap 710 can be removed if the connection unit 701 needs to be removed or placed onto the elongated member 701. The elongated member 701 shown can include a base 711 coupled to the other end of the elongated member 701, which contacts the ground. The base 711 shown can extend perpendicular to the elongated member to provide a wider base for stability. The base 711 can be made from a variety of materials, such as rubber, plastic, or other polymeric material. In one embodiment, the base 711 can be made from rubber to provide added grip to stabilize the stabilizing adaptor 700.

Methods of Practicing the Devices

As stated above, a device for moving a toilet can be coupled to a toilet, either directly or via an adaptor, in order to move the toilet. The complete toilet can be moved with the device, or parts of the toilet can be moved with the device, such as the toilet without the tank, seat, or both. The toilet can be, for example, a new toilet that needs to be moved for transport, storage, or installation. The toilet can also be, for example, a used toilet that needs to be moved, repaired, replaced, etc. In such case, the toilet can be disconnected from the mount at the appropriate time. In some instance, the device can be coupled to the toilet before disconnecting the toilet from the mount to assist the user with disconnecting the toilet. In other instances, the toilet can be disconnected from the mount first and the device coupled thereafter. For the sake of clarity and brevity, the specifics of disconnecting and connecting the toilet from a toilet mount are not provided herein. The following described example methods can be applicable to moving a complete or incomplete toilet with the device. It should be appreciated that the methods are illustrative and that variations are possible without compromising the underlying principles of the present disclosure.

In general, a user determines the desired area and manner of engaging the toilet with the device for moving a toilet, such as the device 100 shown in FIGS. 1A and 1B. For example, the user can determine to couple the device 100 to the toilet by engaging the desired engaging members 102, 103 to the neck of the toilet from around the neck; the neck of the toilet through the seat holes in the neck; the neck of the toilet via the coupling adaptor coupled to the neck; the rim of the toilet bowl; the lower exterior of the toilet bowl from around the toilet bowl; or a combination thereof, such as the rim of the toilet bowl and the neck of the toilet either through the seat holes or via the coupling adaptor. It should be appreciated that the engaging members 102,103 are not limited to include the extension elements 106,107 shown in FIGS. 1A and 1B. For instance, the engaging members 102,103 can include any combination of the extension elements 106,306,406,506 coupled to the collars 104,105 in various embodiments. Furthermore, it should be appreciated that part, or all, of the engaging members 102,103 can be removed and replaced with the desired engaging members (or parts thereof) in various embodiments. For instance, in one embodiment, the desired extension elements can be removably coupled to the collars 104,105. In another embodiment, the entire engaging members 102,103 can be removed and replaced with the desired engaging members.

If the user decides to couple the device 100 to the toilet via the coupling adaptor 600, then the user can couple the coupling adaptor 600 to the neck of the toilet. The user can position the coupling adaptor 600 on the top of the neck of the toilet with the ends 607 of the spacing elements 602 of the coupling adaptor 600 placed on the neck of the toilet, which provides a space between the neck of the toilet and the body 601 of the coupling adaptor 600. The securing element 603 can then be used to securely fasten the coupling adaptor 600 to the toilet. For example, the securing element 603 can be securely fastened around the neck of the toilet, the tank of the toilet, the lower exterior of the toilet bowl, or combination thereof. In one embodiment, the securing element 603 can be securely fastened around the tank of the toilet and the lower exterior of the toilet bowl.

In general, if part or all of the engaging members 102,103 are removable, the user can select the desired (or appropriate) engaging members 102,103, or part thereof, for the desired area and manner for engagement. For example, in one embodiment, the user can select two of the extension elements 106,306,406,506 based on the desired area and manner for engagement. If the undesired (or inappropriate) extension elements for the desired area and manner are currently coupled to the device, the user can first remove the undesired extension elements. For example, the user can depress the locking element 118 to unlock and remove the undesired extension element from the extension through-holes 129,130 on the collar 104. Then the user can similarly repeat the process for the undesired extension element in the collar 105. The desired extension elements can then be coupled to the collars 104,105. For example, while depressing the locking element 118, the user can insert the first desired extension element into the extension through-holes 129,130 of the collar 104. Once the first selected extension element is inserted into the extension through-holes 129, 130, the user can release the locking element 118 when the contact surface of the first selected extension element is at the approximate desired distal distance to the elongated member 101. To ensure that the first selected extension element is locked in the collar 104, the user can slide the first selected extension element until the one or more grooves on each leg of the first selected extension element are adjacent to the locking element 118 and the locking element 118 is forced into the locked mode by the spring 133. The user can similarly repeat this process for the second desired extension element and the collar 105. Once the first and second extension elements are coupled to the device 100, the user can unlock and displace the collars 104,105 accordingly to engage the first and second extension elements with the toilet in the desired areas and manners. The device can then be used by the user to move the toilet.

In the following figures, FIGS. 8-14, descriptions are provided for coupling the device to the toilet in various desired areas and manners, according to example embodiments. For reference purposes, the devices in the following figures, FIGS. 8-14, are referred to with different reference numbers than the device 100 when the device includes different extension elements from those shown coupled to the device 100 in FIGS. 1A and 1B. It should be appreciated, however, that the previous discussions related to the common features and function of the device 100 can similarly apply here, and that not all common features and function are repeated here for the sake clarity and brevity. Furthermore, the common components (e.g., elongated member, collars, and components thereof) may be referred to using the same reference numbers as previously identified in the previous figures. Further, for the sake of clarity, some common components in the previous figures may be referenced despite not being visible in FIGS. 8-14.

Engaging a Neck of a Toilet from Around the Neck

In general, when the engaging members of the device are to engage the neck of the toilet from around the neck, the user can displace the engaging members far enough apart on the elongated member to fit around the neck of the toilet. With the device held over the top of the neck, the user can then position the contact surfaces of the engaging members around the neck of the toilet. Once inserted below the neck of the toilet, the user can displace one or both of the engaging members inward until both of the engaging members securely engage the neck of the toilet.

Figure 8A:
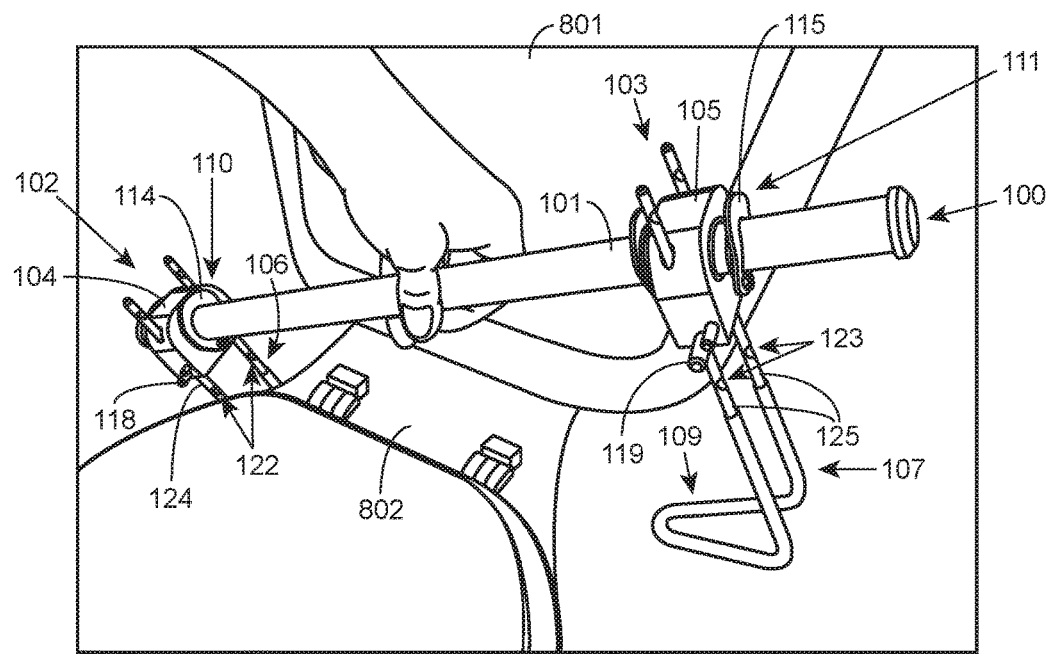
FIG. 8A depicts a perspective view of a device for moving a toilet before the device is fully engaged with a neck of a toilet from around the neck, according to an embodiment.
Figure 8B:
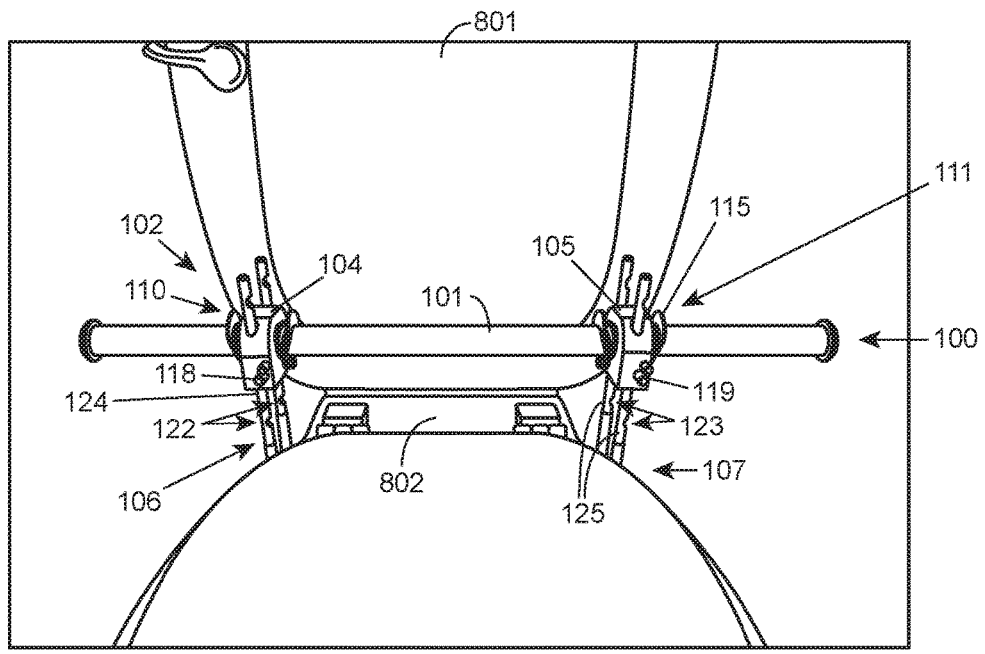
FIG. 8B depicts a perspective view of the device shown in FIG. 8A when the device is fully engaged with a neck of a toilet from around the neck, according to an embodiment.

FIG. 8A depicts a perspective view of the device 100 before the device 100 is fully engaged with a neck 802 of a toilet 801 from around the neck 802, according to an embodiment. FIG. 8B depicts a perspective view of the device 100 shown in FIG. 8A when fully engaged with the neck 802 of the toilet 801 from around the neck 802, according to an embodiment. FIGS. 8A and 8B are described together herein. As shown in FIGS. 8A and 8B, the device 100 can include the engaging member 102,103. The engaging members 102,103 can include the collars 104,105 and the extension elements 106,107, respectively. The extension elements 106,107 can include the contact surfaces 108,109 and the legs 124,125, which can have the grooves 122,123 dispose thereon, respectively.

When coupling the device 100 to the neck 802 of the toilet 801, the user can hold the elongated member 101 with one hand above the neck 802. The user can then unlock the locking mechanism 110 for the collar 104 by squeezing the friction washers 114 with the other hand and displace the collar 104 outward along the elongated member 101 until both of the contact surfaces 108,109 can fit around the neck 802 of the toilet 801. If necessary, the user can unlock the locking mechanism 111 for collar 105 by squeezing the friction washers 115 and displace the collar 105 outward so that both of the contact surfaces 108,109 can fit around the neck 802 of the toilet 801. The contact surface 108 (shown hidden in FIGS. 8A and 8B) can then be positioned around one side of the neck 802 of the toilet 801. If the contact surface 108 is to engage around the seat bolt, then the user can tilt the device 100 to position the contact surface 108 around the seat bolt (not shown) protruding from the bottom of the neck, as shown in FIG. 8A. The collar 104 can then be displaced inward along the elongated member 101 until the contact surface 108 securely engages the neck 802 of the toilet 801. The user can then lock the locking mechanism 110 by releasing the friction washers 114 so that the contact surface 108 of the collar 104 remains securely engaged with the neck 802 of the toilet 801. Similarly, the user can unlock the locking mechanism 111 for collar 105 by squeezing the friction washers 115. The collar 105 can then be displaced inward along the elongated member 101 until the contact surface 109 of the collar 105 securely engages the neck 802 on the opposite side of the neck 802. If the contact surface 109 is to engage around the seat bolt, then the user can tilt the device 100 to position the contact surface 109 around the seat bolt. The user can then lock the locking mechanism 111 by releasing the friction washers 115 so that the contact surface 109 of the collar 105 remains securely coupled to the underside of the neck 802.

If the device 100 does not feel solid and secure once coupled, the user can unlock and reposition one of the collars 104,105 until a snug fit is formed. In some instances, the user can further stabilize the device 100 to the neck 802 by depressing the locking elements 118,119 (e.g., one at a time) to unlock and insert the extension elements 106,107 further into the collars 104,105, respectively. The user can release the locking elements 118,119 such that the locking elements 118,119 will automatically reenter the locked mode when one of the grooves 122,123 becomes adjacent to the locking element 118,119, respectively. In this way, the collars 104,105 can be positioned closer to the neck 802 of the toilet 801 to provide a more stable coupling to the neck 802 of the toilet 801. In some instances, the collars 104,105 or the elongated member 101 can abut the top of the neck 802 of the toilet 801 and provide extra stability. When coupled securely, the device 100 can have little to no sideway movement (or "slop") and can have little to no vertical (or up and down) movement.

When the device 100 is securely coupled to the neck 802 of the toilet 801, as shown in FIG. 8B, the elongated member 101 can be used as a handle for the user to hold to move the toilet 801. The user can move the toilet 801 with one or both hands as desired. For example, the user can move the toilet 801 with one hand without the need to bend over the device 100 while securing the toilet 801 with the free hand. As another example, two users can stand on each side of the toilet 801 and hold opposite ends of the elongated member 101 outside of the collars 104,105 to move the toilet. When finished moving the toilet 801, the user can remove the device 100 by unlocking and displacing one or both collars 104,105 until the respective extension elements 106,107 are no longer engaged under the neck 802 of the toilet 801. The user can then remove the contact surfaces 108,109 from around the neck 802. The device 100 can then be used to move the same, or different, toilet.

Engaging an Exterior of a Toilet Bowl

Figure 9A:
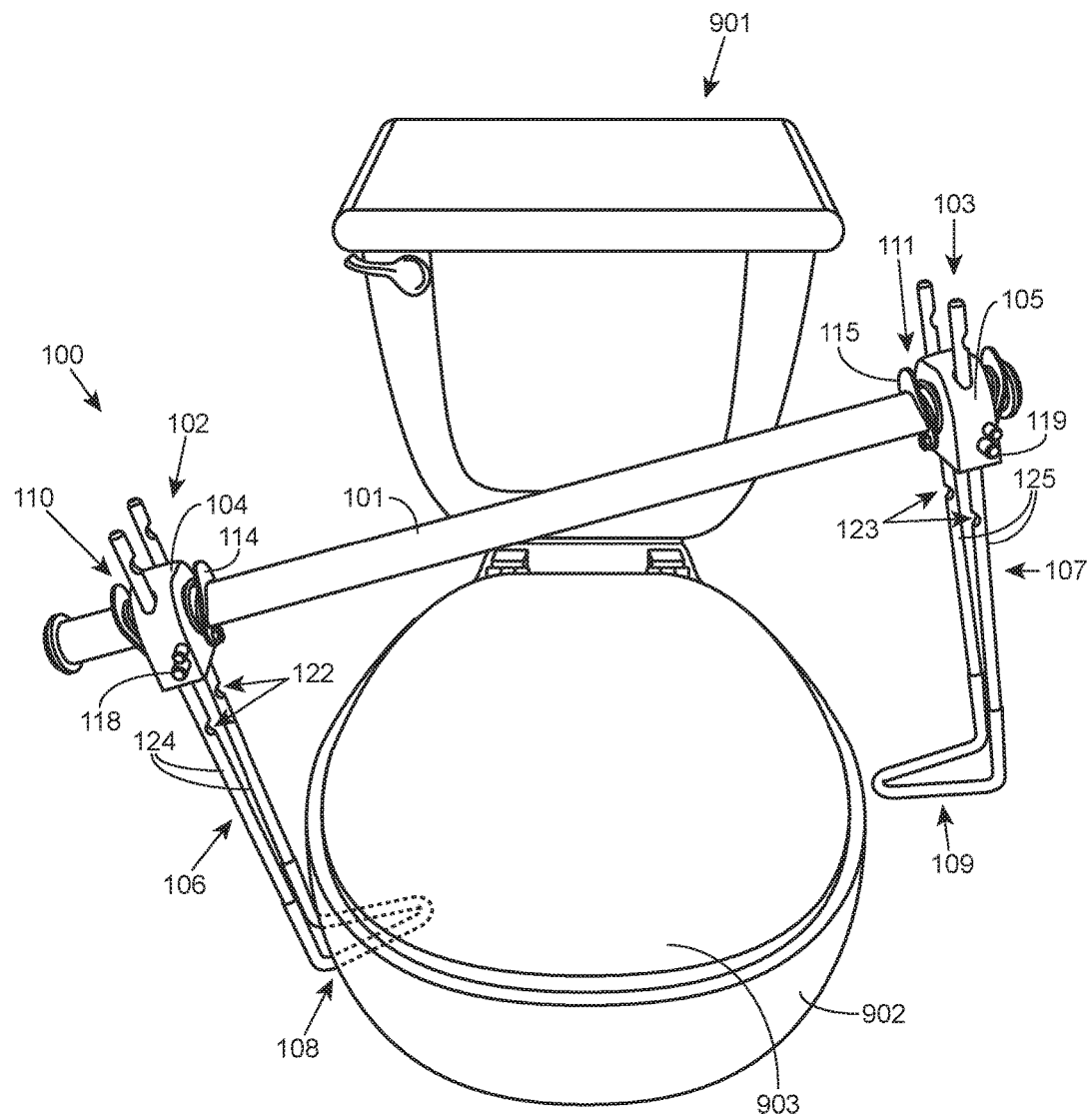
FIG. 9A depicts a perspective view of a device for moving a toilet before the device is fully engaged with an exterior of a toilet bowl from around the toilet bowl, according to an embodiment.
Figure 9B:
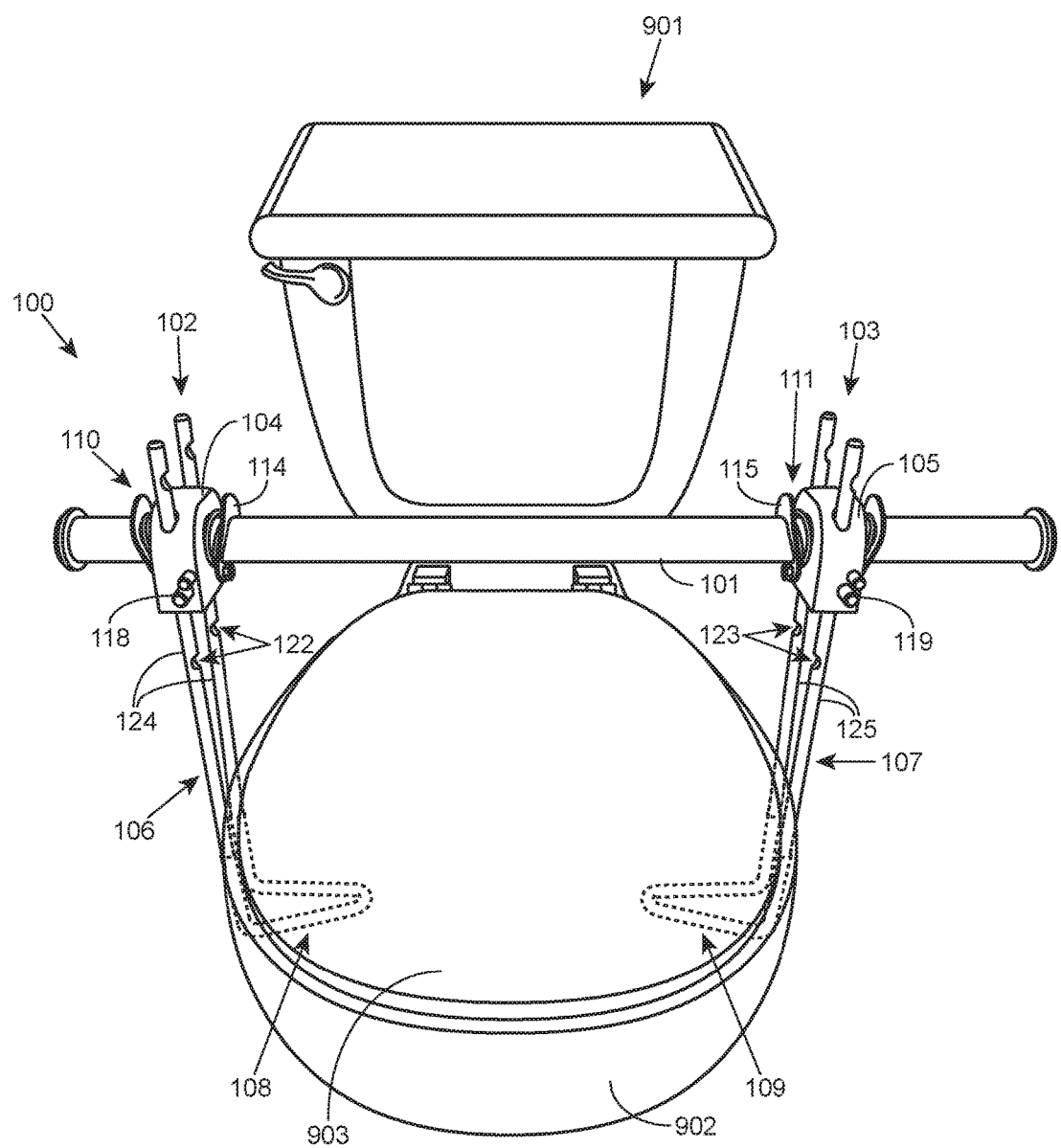
FIG. 9B depicts a perspective view of the device shown in FIG. 9A when the device is fully engaged with the exterior of the toilet bowl from around the toilet bowl, according to an embodiment.

In general, when the engaging members are to engage the exterior of the toilet bowl, the user can displace the engaging members far enough apart on the elongated member to fit around the exterior of the toilet bowl. With the device held over the top of the toilet bowl, the user can then position the contact surfaces of the engaging members around the exterior of the toilet bowl. Once inserted below the exterior of the toilet bowl, the user can displace one or both of the engaging members inward until both of the engaging members securely engage the exterior of the toilet bowl. If the engaging members are to be placed under the toilet (or under the exterior of the toilet bowl), then the user can lift one side of the toilet while the first engaging member is placed under one side of the toilet. The opposite side of the toilet can then be lifted to place the other engaging member under the toilet FIG. 9A depicts a perspective view of the device 100 before the device 100 is fully engaged with an exterior of a toilet bowl 902 from around the toilet bowl 902, according to an embodiment. FIG. 9B depicts a perspective view of the device 100 shown in FIG. 9A when fully engaged with the exterior of the toilet bowl 902 from around the toilet bowl 902, according to an embodiment. FIGS. 9A and 9B are described together herein. As shown in FIGS. 9A and 9B, the device 100 can include the engaging member 102,103. The engaging members 102,103 can include the collars 104,105 and the extension elements 106,107, respectively. The extension elements 106,107 can include the contact surfaces 108,109 and the legs 124,125, which can have the grooves 122,123 dispose thereon, respectively.

When coupling the device 100 to the exterior of the toilet bowl 902 of the toilet 901, the user can hold the elongated member 101 with one hand above the toilet bowl 902. The user can then unlock the locking mechanism 110 for the collar 104 by squeezing the friction washers 114 with the other hand and displace the collar 104 outward along the elongated member 101 until both of the contact surfaces 108,109 can fit around the exterior of the toilet bowl 902. If necessary, the user can unlock the locking mechanism 111 for collar 105 by squeezing the friction washers 115 and displace the collar 105 outward so that both of the contact surfaces 108,109 can fit around the exterior of the toilet bowl 902. The contact surfaces 108,109 can then be positioned around the exterior of the toilet bowl 902. The collar 104 can then be displaced inward along the elongated member 101 until the contact surface 108 securely engages the exterior of the toilet 901, as shown in FIG. 9A. If the contact surface 108 is to engage under the exterior of the toilet bowl 902, then the user can lift one side of the toilet bowl 902 while the contact surface 108 is inserted under one side of the toilet bowl 902. The user can then lock the locking mechanism 110 by releasing the friction washers 114 so that the contact surface 108 of the collar 104 remains securely engaged with the exterior of the toilet bowl 902. Similarly, the user can unlock the locking mechanism 111 for collar 105 by squeezing the friction washers 115. The collar 105 can then be displaced inward along the elongated member 101 until the contact surface 109 of the collar 105 securely engages the exterior of the toilet bowl 902 on the opposite side of the toilet bowl 902. If the contact surface 109 is to engage under the exterior of the toilet bowl 902, then the user can lift that side of the toilet bowl 902 while the contact surface 109 is inserted under the exterior of the toilet bowl 902. The user can then lock the locking mechanism 111 by releasing the friction washers 115 so that the contact surface 109 of the collar 105 remains securely coupled to the exterior of the toilet bowl 902.

If the device 100 does not feel solid and secure once coupled, the user can unlock and reposition one of the collars 104,105 until a snug fit is formed. In some instances, the user can further stabilize the device 100 to the exterior of the toilet bowl 902 by depressing the locking elements 118,119 (e.g., one at a time) to unlock and insert the extension elements 106,107 further into the collars 104,105, respectively. The user can release the locking elements 118,119 such that the locking elements 118,119 will automatically reenter the locked mode when one of the grooves 122,123 becomes adjacent to the locking element 118,119, respectively. In this way, the collars 104,105 can be positioned closer to the seat 903 (or rim if no seat is present) of the toilet 901 to provide a more stable coupling between the seat 903 of the toilet 901. In some instances, the collars 104,105 or the elongated member 101 can abut the top of the seat 903 of the toilet bowl 902 and provide extra stability. When coupled securely, the device 100 can have little to no sideway movement (or "slop") and can have little to no vertical (or up and down) movement.

When the device 100 is securely coupled to the exterior of the toilet bowl 902, as shown in FIG. 9B, the elongated member 101 can be used as a handle for the user to hold to move the toilet 901. The user can move the toilet 901 with one or both hands as desired. For example, the user can move the toilet 901 with one hand without the need to bend over the device 100 while securing the toilet 901 with the free hand. As another example, two users can stand on each side of the toilet 901 and hold opposite ends of the elongated member 101 outside of the collars 104,105 to move the toilet. When finished moving the toilet 901, the user can remove the device 100 by unlocking and displacing one or both collars 104,105 until the respective extension elements 106,107 are no longer engaged under the exterior of the toilet bowl 902. The user can then remove the contact surfaces 108,109 from around the exterior of the toilet bowl 902. The device 100 can then be used to move the same, or different, toilet.

Engaging a Rim of a Toilet

In general, when the engaging members coupled to the device are to engage the rim of the toilet bowl, the user can displace the engaging members close enough together on the elongated member to fit within the toilet bowl. The contact surfaces of the engaging members can then be inserted into the toilet bowl below the rim of the toilet. Once inserted below the rim of the toilet, the user can displace one or both of the engaging members outward until both of the engaging members securely engage the rim of the toilet.

Figure 10A:
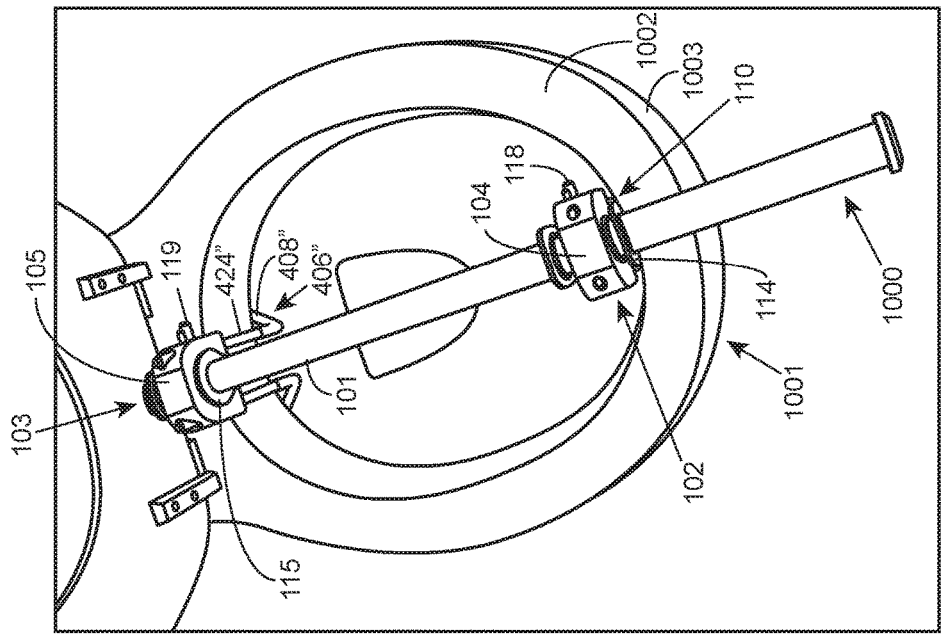
FIG. 10A depicts a perspective view of a device for moving a toilet before the device is fully engaged with a rim of a toilet bowl, according to an embodiment.
Figure 10B:
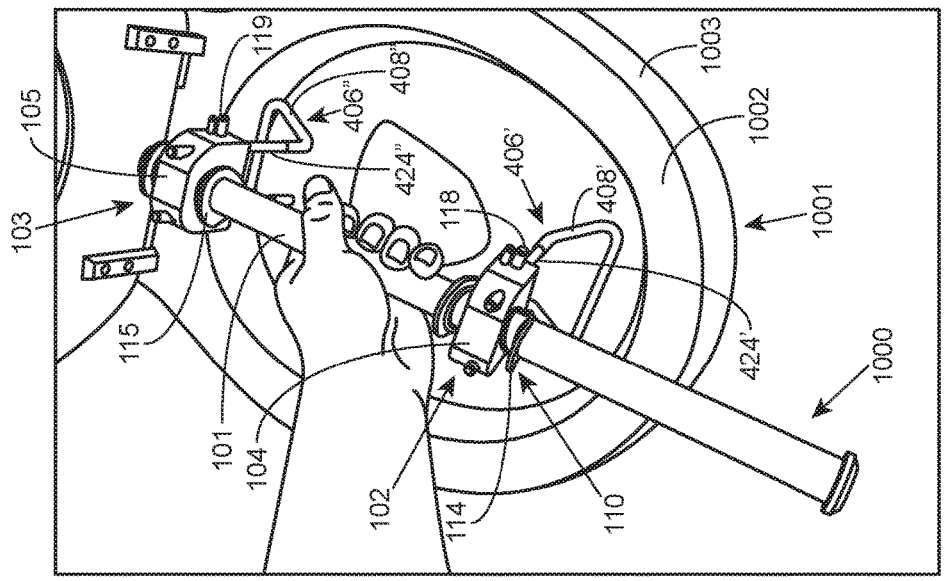
FIG. 10B depicts a perspective view of the device shown in FIG. 10A when the device is fully engaged with the rim of the toilet, according to an embodiment.

FIG. 10A depicts a perspective view of a device 1000 before the device 1000 is fully engaged with a rim 1002 of a toilet bowl 1003 of a toilet 1001, according to an embodiment. FIG. 10B depicts a perspective view of the device 1000 shown in FIG. 10A when the device 1000 is fully engaged with the rim 1002 of the toilet bowl 1003, according to an embodiment. FIGS. 10A and 10B are described together herein. As shown in FIGS. 10A and 10B, a device 1000 can include the engaging member 102,103. The engaging members 102,103 can include a collars 104,105 and extension elements 406',406" coupled to the collars 104,105, respectively. The extension element 406' can be the same, for instance, as the previously described extension element 406 in FIG. 4. The extension element 406' can have grooves 422' on the opposite side of legs 424' from which a contact surface 408' extends. The extension element 406" can be similar to the previously described extension element 406, except that the extension element 406" can have grooves 422" on the same side of legs 424" from which a contact surface 408' extends.

When coupling the device 1000 to the rim 1002 of the toilet bowl 1003 of the toilet 1001, the user can hold the elongated member 101 with one hand above the rim 1002 of the toilet 1001. The user can then unlock the locking mechanism 110 for the collar 104 by squeezing the friction washers 114 with the other hand and displace the collar 104 inward along the elongated member 101 until both of the contact surfaces 408',408" can fit within the rim 1002 of the toilet bowl 1003. The contact surfaces 408',408" can then be inserted within the toilet bowl 1003 below the rim 1002, as shown in FIG. 10A. The user can start with the collar 105 displaced all the way to the end of the elongated member 101 and then displace the device 1000 to stably engage the contact surface 408" to the rim 1002 of the toilet bowl 1003. Alternatively, if desired, the user can start with the collar 105 generally in the middle of the elongated member 101. The user can unlock the locking mechanism 111 for the collar 105 by squeezing the friction washers 115. The collar 105 can then be displaced outward along the elongated member 101 until the contact surface 408" of the collar 105 securely engages the rim 1002 of the toilet bowl 1003. The user can then lock the locking mechanism 111 by releasing the friction washers 115 so that the contact surface 408" of the collar 105 is stably engaged with the rim 1002 of the toilet bowl 1003. Once the contact surface 408" is engaged with the rim 1002, the collar 104 can be displaced outward along the elongated member 101 until the contact surface 408' of collar 104 securely engages to the underside of the rim 1002 of the toilet 1001. The user can then lock the locking mechanism 110 by releasing the friction washers 114 so that the contact surface 408' of the collar 104 remains securely engaged with the rim 1002 of the toilet bowl 1003.

When coupled securely, the device 1000 can have little to no sideway movement (or "slop") and can have little to no vertical (or up and down) movement. If the device 1000 does not feel solid and secure once coupled, the user can unlock and reposition one of the collars 104,105 until a snug fit is formed. In some instances, the user can further stabilize the device 1000 to the rim 1002 of the toilet 1001 by depressing the locking elements 118,119 (e.g., one at a time) to unlock and insert the extension elements 406',406" further into the collars 104,105, respectively. The user can release the locking elements 118,119 such that the locking elements 118,119 will automatically reenter the locked mode when one of the grooves 422',422" becomes adjacent to the locking element 118,119, respectively. In this way, the collars 104,105 can be positioned closer to the rim 1002 of the toilet 1001 to provide a more stable coupling to the rim 1002 of the toilet bowl 1003. In some instances, the collars 104,105 or the elongated member 101 can abut the top of the rim 1002 of the toilet bowl 1003 and provide extra stability. Alternatively, the user can start with the contact surfaces 408',408"

at the approximate desired distal distance to the elongated member 101 to closely engage to the rim 1002 of the toilet bowl 1003.

When the device 1000 is securely coupled to the rim 1002 of the toilet bowl 1003, such as shown in FIG. 10B, the elongated member 101 can be used as a handle for the user to hold to move the toilet 1001. The user can move the toilet 1001 with one or both hands as desired. For example, the user can move the toilet 1001 with one hand without the need to bend over the device 1000 while securing the toilet 1001 with the free hand. As another example, two users can stand on each side of the toilet 1001 and hold the elongated member 101 to move the toilet 1001. When finished moving the toilet 1001, the user can remove the device 1000 by unlocking and displacing one or both collars 104,105 until the extension elements 406',406" are no longer engaged under the rim 1002 of the toilet bowl 1003. The user can then remove the contact surfaces 408',408" from inside the toilet bowl 1003. The device 1000 can then be used to move the same, or different, toilet as needed by similarly repeating the process. It should be appreciated that the extension elements 406',406" can be engaged with the rim 1002 of the toilet 1001 at various positions within the toilet bowl 1003. For example, the extension elements 406',406" can be engaged with the respective front and back ends of the rim 1002, such as shown in FIG. 10B. For reference purposes, the back end and front end of the toilet may also be referred to herein as the 12 o'clock and 6 o'clock positions, respectively. In other instances, the extension elements 406',406" can be engaged with the opposite sides of the rim 1002 (or the 3 o'clock and 9 o'clock positions), or any other opposite ends of the rim 1002.

Engaging a Neck of a Toilet Through Seat Holes

In general, when the engaging members are to engage the neck of the toilet through the seat holes in the neck, the user can remove the seat to expose the seat holes. The user can displace the engaging members to align with the seat holes. With the device held over the top of the neck, the user can insert the contact surfaces of the engaging members through the seat holes in the neck. Once positioned through the seat holes of the neck, the user can adjust one or both of the engaging members longitudinally along the elongated member if better alignment is necessary.

Figure 11A:
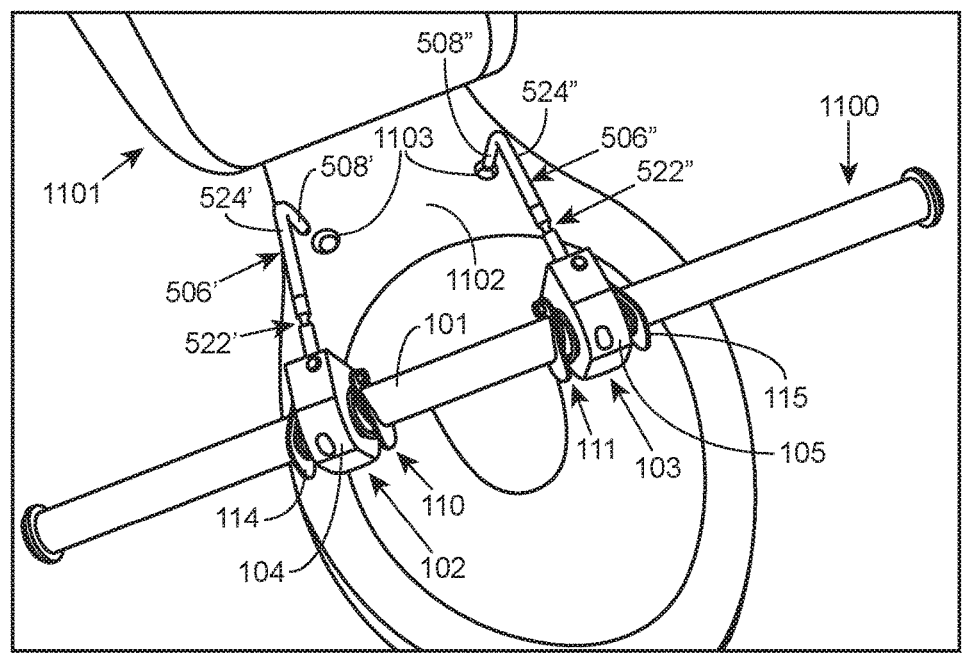
FIG. 11A depicts a perspective view of a device for moving a toilet before the device is fully engaged with a neck of a toilet through seat holes, according to an embodiment.
Figure 11B:
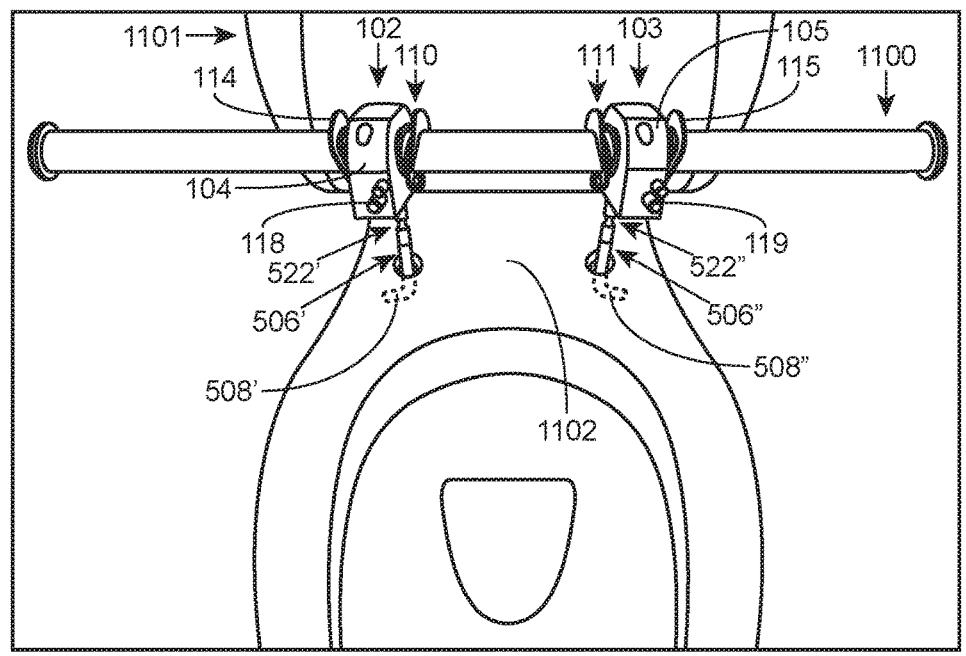
FIG. 11B depicts a perspective view of the device shown in FIG. 11A when the device is fully engaged with the neck of the toilet through the seat holes, according to an embodiment.

FIG. 11A depicts a perspective view of a device 1100 before the device 1100 is fully engaged with a neck 1102 of a toilet 1101 through seat holes 1103, according to an embodiment. FIG. 11B depicts a perspective view of the device 1100 shown in FIG. 11A when fully engaged with the neck 1102 of the toilet 1101 through the seat holes 1103, according to an embodiment. FIGS. 11A and 11B are described together. As shown in FIGS. 11A and 11B, the device 1100 can include the engaging member 102,103. The engaging members 102,103 can include the collars 104,105 and extension elements 506',506" coupled to the collars 104,105, respectively. The extension elements 506',506" can be the same, for instance, as the previously described extension element 506 in FIG. 5. The extension elements 506',506" can include contact surfaces 508',508" and legs 524',524", which can have grooves 522',522" dispose thereon, respectively.

The extension elements 506',506" can be shackles having a single leg 524',524", respectively. The extension element 506',506" can be inserted (e.g., one at a time) into either one of the extension through-holes in the collars 104,105 while depressing the locking elements 118,119 to activate the unlocked mode, respectively. The user can release the locking elements 118,119 so that the respective extension element 506',506" can become locked once properly inserted at the desired position, which corresponds to the contact surfaces 508',508" being maintained at a certain distal distance to the elongated member 101. To provide a better fit, each of the extension elements 506',506" can be inserted into an extension through-hole on the same side of the collars 104,105. If the seat is still coupled to the neck 1102 of the toilet 1101, then the seat can be removed by removing the seat bolts.

When coupling the device 1100 to the neck 1102 of the toilet 1101 through the seat holes 1103, the user can unlock the locking mechanisms 110,111 for the collars 104,105 by squeezing the friction washers 114,115 to displace the collars 104,105 along the elongated member 101 until both of the contact surfaces 508',508" are the approximate width of the seat holes 1103, respectively. The user can then lock the locking mechanisms 110,111 by releasing the friction washers 114,115, respectively. The user can then hold the device 1100 above the toilet bowl 1104 with the contact surfaces 508',508" of the respective extension elements 506',506" pointing down towards the seat holes 1103, as shown in FIG. 11B. The elongated member 101 can be oriented with the contact surfaces 508',508" closer to a vertical orientation in order to more easily insert the contact surfaces 508',508" into the seat holes 1103. The contact surface 508" can then be inserted through one of the seat holes 1103. If necessary, the user can unlock and lock the locking mechanism 110 of the collar 104 to displace the collar 104 as necessary to more precisely align with the other one of the seat holes 1103. Once aligned with the seat holes 1103, the contact surface 508' can be inserted through the other one of the seat holes 1103. While rotating the elongated member 101 about the axis extending through the two seat holes 1103, the user can position the elongated member 101 over the neck 1102 with the contact surfaces 508',508" becoming parallel to the neck 1102. The user can then rotate each of the contact surfaces 508',508" about the respective axis of the respective leg 524',524" to extend in directions that provide stability, such as in directions away from one another.

In some instances, the user can further stabilize the device 1100 to the neck 1102 by depressing the locking elements 118,119 (e.g., one at a time) to unlock and insert the extension elements 506'506" further into the collars 104, 105, respectively. The user can release the locking elements 118,119 such that the locking elements 118,119 will automatically reenter the locked mode when one of the grooves 522',522" becomes adjacent to the locking elements 118, 119, respectively. In this way, the collars 104,105 can be positioned closer to the neck 1102 of the toilet 1101 to provide a more stable coupling to the neck 1102 of the toilet 1101. In some instances, the collars 104,105 of the elongated member 101 can abut the top of the neck 1102 of the toilet 1101 and provide extra stability. When coupled securely, the device 1100 can have little to no sideway movement (or "slop") and can have little to no vertical (or up and down) movement. If the device 1100 does not feel solid and secure once coupled, the user can unlock and reposition one of the collars 104,105 until a snug fit is formed.

When the device 1100 is securely coupled to the neck 1102 of the toilet 1101, as shown in FIG. 11B, the elongated member 101 can be used as a handle for the user to hold to move the toilet 1101. The user can move the toilet 1101 with one or both hands as desired. For example, the user can move the toilet 1101 with one hand without the need to bend over the device 1100 while securing the toilet 1101 with the free hand. As another example, two users can stand on each side of the toilet 1101 and hold the elongated member 101 on the outside of the collars 104,105, for instance. When finished moving the toilet 1101, the user can remove the device 1100 by rotating the contact surfaces 508',508" to extend back in the original direction during insertion into the seat holes 1103. The elongated member 101 can then be rotated about the axis extending through the seat holes 1103, until the elongated member 101 is rotated back over the toilet bowl 1104 so that the contact surfaces 508',508" are oriented closer to a vertical orientation. The contact surfaces 508',508" can then be removed from the seat holes 1103. The device 1100 can then be used to move the same, or different, toilet.

Engaging a Neck of a Toilet Via a Coupling Adaptor

In general, when the engaging members are to engage the neck of the toilet via the coupling adaptor coupled to the neck, the seat of the toilet does not necessarily have to be removes, such as to expose the seat holes. As previously described above, the user can couple the coupling adaptor to the neck of the toilet. The user can then displace the engaging members to align with the holes on the coupling adaptor. With the device held over the top of the seat, the user can insert the contact surfaces of the engaging members through the holes in the coupling adaptor. Once positioned through the holes in the coupling adaptor, the user can adjust one or both of the engaging members longitudinally along the elongated member if better alignment is necessary.

Figure 12A:
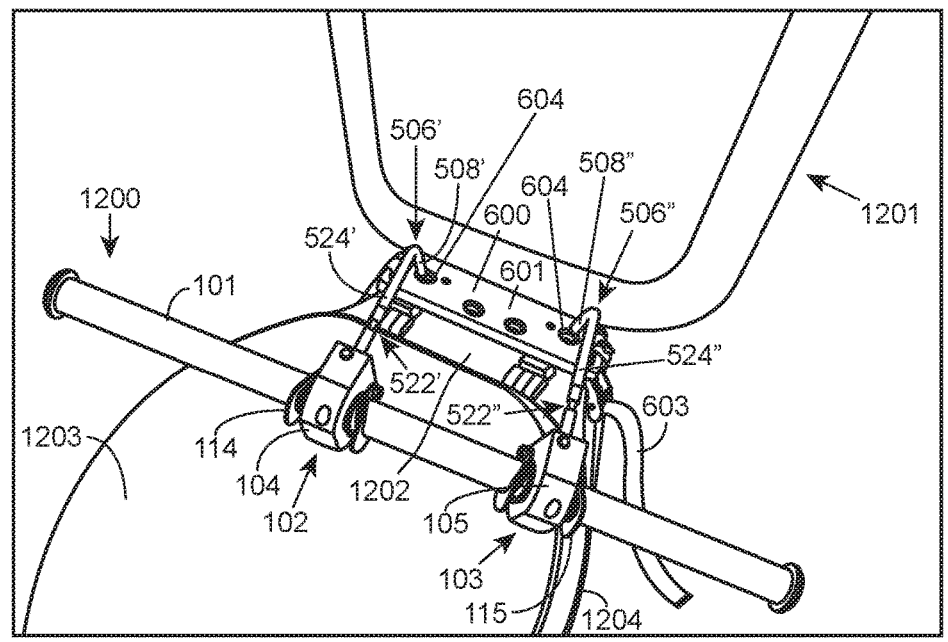
FIG. 12A depicts a perspective view of a device for moving a toilet before the device is fully engaged with a neck of a toilet via a coupling adaptor, according to an embodiment.
Figure 12B:
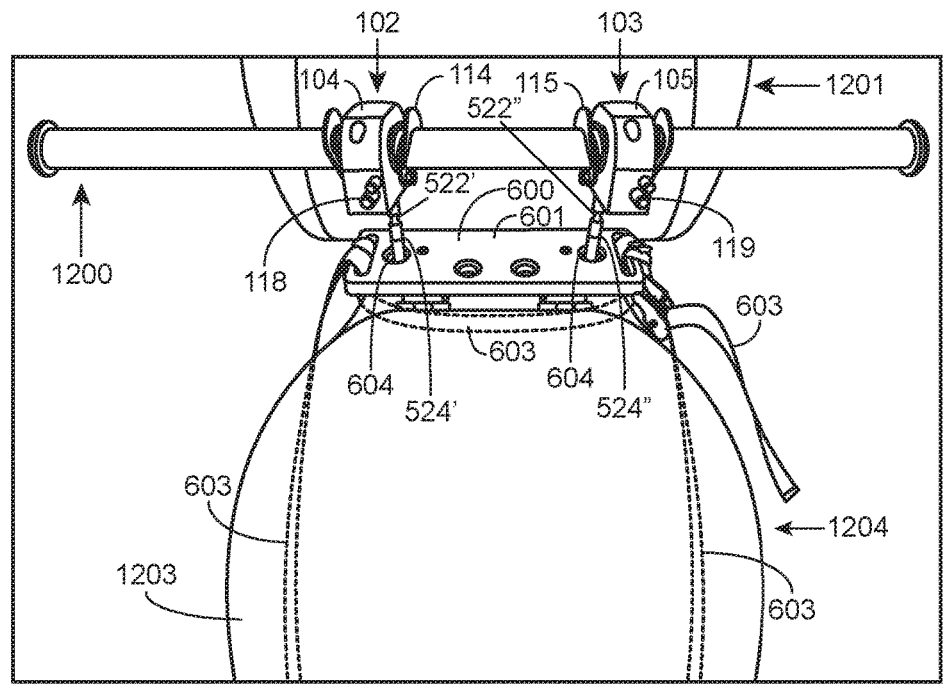
FIG. 12B depicts a perspective view of the device shown in FIG. 12A when the device is fully engaged with the neck of the toilet via the coupling adaptor, according to an embodiment.

FIG. 12A depicts a perspective view of a device 1200 before the device 1200 is fully engaged with a neck 1202 of a toilet 1201 via an adaptor 600, according to an embodiment. FIG. 12B depicts a perspective view of the device 1200 shown in FIG. 12A when fully engaged with the neck 1202 of the toilet 1201 via the adaptor 600, according to an embodiment. FIGS. 12A and 12B are described together herein. As shown in FIGS. 12A and 12B, the device 1200 can include the engaging member 102,103. The engaging members 102,103 can include the collars 104,105 and extension elements 506',506" coupled to the collars 104,105, respectively. The extension elements 506',506" can be the same, for instance, as the previously described extension element 506 in FIG. 5. The extension elements 506',506" can include contact surfaces 508',508" and legs 524',524", which have grooves 522',522" dispose thereon, respectively. As previously described above, the user can couple the coupling adaptor 600 to the neck 1202 of the toilet 1201 with the spacing elements 602 (not shown in FIGS. 12A and 12B) disposed on the neck 1202 of the toilet 1201. The spacing elements 602 can provide a space between the neck 1202 of the toilet 1201 and the body 601 of the coupling adaptor 600. The coupling adaptor 600 is shown in FIGS. 12A and 12B as having already been securely coupled to the neck 1202 of the toilet 1201. The coupling adaptor 600 includes a securing element 603 (parts of which are shown dotted in FIGS. 12A and 12B when hidden) that can be securely fastened around the neck 1202 and the exterior of the toilet bowl 1204, for instance.

The extension elements 506',506" can be shackles having a single leg 524',524", respectively. The extension element 506',506" can be inserted (e.g., one at a time) into either one of the extension through-holes in the collars 104,105 while depressing the locking elements 118,119 to activate the unlocked mode, respectively. The user can release the locking elements 118,119 so that the respective extension element 506',506" can become locked once properly inserted at the desired height. To provide a better fit, each of the extension elements 506',506" can be inserted into an extension through-hole on the same side of the collars 104,105. The seat 1203 can remain on the toilet 1201 when the coupling adaptor 600 is coupled to the neck 1202 of the toilet 1201. In some instances, depending on the specific design of the toilet 1201 or the preference of the user, the seat 1203 can be removed first before coupling the coupling adaptor 600 to the neck 1202 of the toilet 1201.

When coupling the device 1200 to the neck 1202 of the toilet 1201 via the coupling adaptor 600, the user can unlock the locking mechanisms 110,111 for the collars 104,105 by squeezing the friction washers 114,115 to displace the collars 104,105 outward along the elongated member 101 until both of the contact surfaces 508'508" are the approximately width of the holes 604 in the coupling adaptor 600, respectively. The user can then lock the locking mechanisms 110,111 by releasing the friction washers 114,115, respectively. The user can then hold the device 1200 above the seat 1203 with the contact surfaces 508',508" of the respective extension elements 506',506" pointing down towards the holes 604, as shown in FIG. 12A. The elongated member 101 can be oriented with the contact surfaces 508',508" closer to a vertical orientation in order to more easily insert the contact surfaces 508',508" into the holes 604. The contact surface 508" can then be inserted through one of the holes 604. If necessary, the user can unlock and lock the locking mechanism 110 of the collar 104 to displace the collar 104 as necessary to more precisely align with the other one of the holes 604. Once aligned with the holes 604, the contact surface 508' can be inserted through the other one of the holes 604. While rotating the elongated member 101 about the axis extending through the two holes 604, the user can position the elongated member 101 over the neck 1202 with the contact surfaces 508',508" becoming parallel to the neck 1202. The user can then rotate each of the contact surfaces 508',508" about the respective axis of the respective leg 524',524" to extend in directions that provide stability, such as in directions away from one another.

In some instances, the user can further stabilize the device 1200 to the neck 1202 via the adaptor 600 by depressing the locking elements 118,119 (e.g., one at a time) to unlock and insert the extension elements 506',506" further into the collars 104,105, respectively. The user can release the locking elements 118,119 such that the locking elements 118,119 will automatically reenter the locked mode when one of the grooves 522',522" becomes adjacent to the locking elements 118,119, respectively. In this way, the collars 104,105 can be positioned closer to the coupling adaptor 600 of the toilet 1201 to provide a more stable coupling to the neck 1202 via the coupling adaptor 600. In some instances, the collars 104,105 of the elongated member 101 can abut the top of the coupling adaptor 600 and provide extra stability. When coupled securely, the device 1200 can have little to no sideway movement (or "slop") and can have little to no vertical (or up and down) movement. If the device 1200 does not feel solid and secure once coupled, the user can unlock and reposition one of the collars 104,105 until a snug fit is formed.

When the device 1200 is securely coupled to the neck 1202 of the toilet 1201 via the adaptor 600, as shown in FIG. 12B, the elongated member 101 can be used as a handle for the user to hold to move the toilet 1201. The user can move the toilet 1201 with one or both hands as desired. For example, the user can move the toilet 1201 with one hand without the need to bend over the device 1200 while securing the toilet 1201 with the free hand. As another example, two users can stand on each side of the toilet 1201 and hold the elongated member 101 on the outside of the collars 104,105, for instance. When finished moving the toilet 1201, the user can remove the device 1200 by rotating the contact surfaces 508',508" to extend back in the original direction during insertion into the holes 604. The elongated member 101 can then be rotated about the axis extending through the holes 604, until the elongated member 101 is rotated back over the seat 1203 so that the contact surfaces 508',508" are oriented closer to a vertical orientation. The contact surfaces 508',508" can then be removed from the holes 604. The device 1200 can then be used to move the same, or different, toilet.

Engaging a Rim and a Neck of a Toilet Via a Coupling Adaptor

In general, the device can include engaging members that engage the toilet in different areas and manners. For example, in one embodiment, the device can include an engaging member that can engage the rim of the toilet and another engaging member that can engage the coupling adaptor coupled to the toilet. The user can remove the seat from the toilet by removing the seat bolts in the seat holes of the toilet and then removing the seat. The user can then couple the coupling adaptor to the neck of the toilet, as previously described.

Figure 13B:
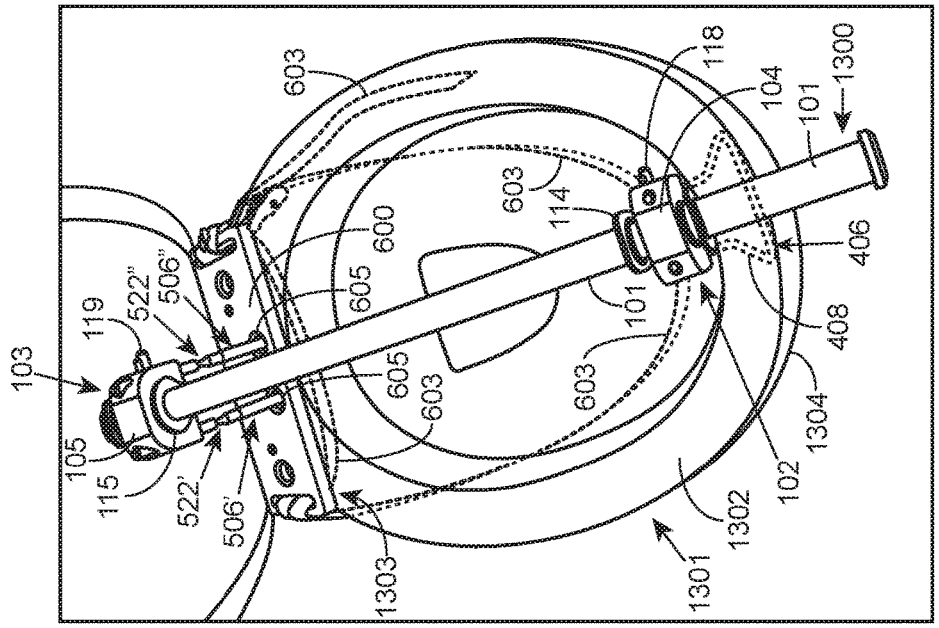
FIG. 13B depicts a perspective view of the device shown in FIG. 13A when the device is fully engaged with the neck of the toilet (via the coupling adaptor) and the rim of the toilet bowl, according to an embodiment.
Figure 13A:
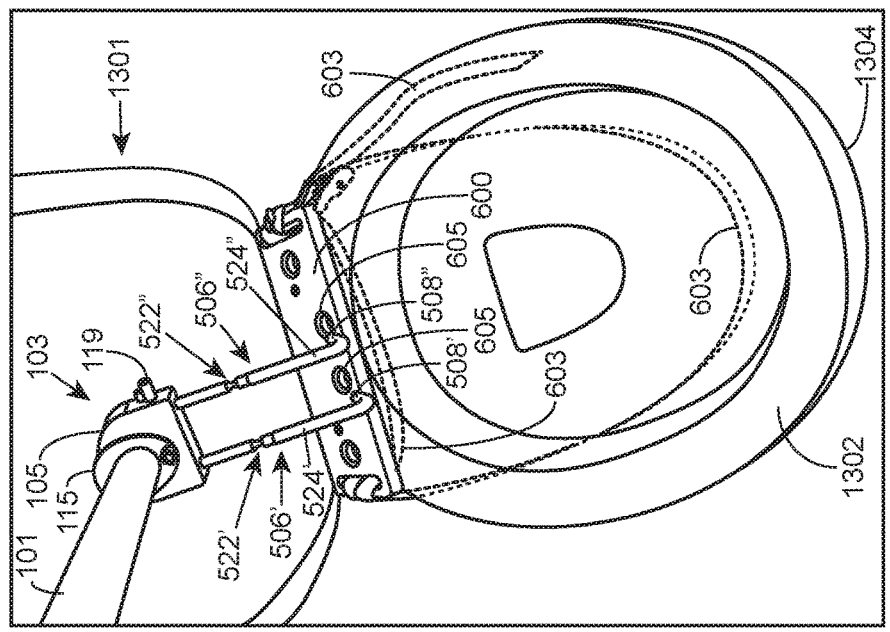
FIG. 13A depicts a perspective view of a device for moving a toilet before the device is fully engaged with a neck of a toilet (via a coupling adaptor) and a rim of a toilet bowl, according to an embodiment.

FIG. 13A depicts a perspective view of a device 1300 before the device 1300 is fully engaged with a neck 1303 of a toilet 1301 and a rim 1302 of a toilet bowl 1304, according to an embodiment. FIG. 13B depicts a perspective view of the device 1300 shown in FIG. 13A when fully engaged with the neck 1303 of the toilet 1301 and the rim 1302 of the toilet bowl 1304, according to an embodiment. FIGS. 13A and 13B are described together herein. As shown in FIGS. 13A and 13B, the device 1300 can include the engaging member 102,103. The engaging member 103 can include the collar 105 and extension elements 506',506" coupled to the collar 105. The extension elements 506',506" can be the same, for instance, as the previously described extension element 506. The extension elements 506',506" can include contact surfaces 508',508" and legs 524',524", which can have grooves 522',522" dispose thereon, respectively. The engaging member 102 can include a collar 104 and the extension element 406 coupled to the collar 104. The extension element 406 can be the same, for instance, as the previously described extension element 406 in FIG. 4. The extension element 406 can have grooves 422 (not shown in FIGS. 13A and 13B) on the opposite side of legs 424 (not shown in FIGS. 13A and 13B) from which a contact surface 408 extends. The coupling adaptor 600 is shown in FIGS. 13A and 13B as having already been securely coupled to the neck 1303 of the toilet 1301. The coupling adaptor 600 includes a securing element 603 (parts of which are shown dotted in FIGS. 13A and 13B when hidden) that is securely fastened around the neck 1303 and the exterior of the toilet bowl 1304.

The extension elements 506',506" can be shackles having a single leg 524',524", respectively. The extension element 506',506" can thus be inserted (e.g., one at a time) into both of the extension through-holes in the collar 105 while depressing the locking element 119 to activate the unlocked mode. The user can release the locking element 119 so that the extension element 506',506" can become locked once properly inserted at the desired position, which corresponds to the contact surfaces 508',508" being maintained at a certain distal distance to the elongated member 101. In another embodiment, only one extension element (e.g., the extension element 506') can be coupled to the collar 105. The engaging member 102 can be configured to engage the rim 1302 of the toilet bowl 1304 by coupling the extension element 406 to the collar 104.

The user can first couple the engaging member 103 to the coupling adaptor 600. The user can first unlock the locking mechanism 111 for the collar 105 by squeezing the friction washers 115 to displace the collar 105 to near the end of the elongated member 101. The user can then lock the locking mechanism 111 by releasing the friction washers 115. The extension elements 506',506" can be spaced to align with the holes 605 of the coupling adaptor 600. In this way, the two extension elements 506',506" can be at the appropriate width to align within the holes 605.

When coupling the device 1300 to the coupling adaptor 600, the elongated member 101 can be oriented so that the end with the collar 105 is in the 12 o'clock position and the end with the collar 104 is in the 6 o'clock position. The extension elements 506',506" can be rotated so that the contact surfaces 508',508" extend outward. The end of the elongated member 101 with the collar 104 can then be rotate upward about the axis extending through the holes 605, as shown in FIG. 13A. In this way, the contact surfaces 508',508" can be oriented closer to a vertical orientation in order to more easily insert the contact surfaces 508',508" into the holes 605. The contact surfaces 508',508" can then be inserted through the holes 605 while rotating the end of the elongated member 101 with the collar 104 back down about the axis extending through the holes 605, until the elongated member 101 is rotated back to being approximately horizontal with the end of the elongated member 101 with the collar 104 in the 6' o'clock position. The user can then rotate the contact surfaces 508',508" to extend in directions that provide stability, such as in directions away from one another.

The user can now couple the engaging member 102 to the rim 1302 of the toilet bowl 1304. For example, the user can unlock the locking mechanism 110 for collar 104 by squeezing the friction washers 114. The collar 104 can then be displaced outward along the elongated member 101 until the contact surface 408 securely engages the rim 1302 on the opposite side of the toilet bowl 1304. The user can then lock the locking mechanism 110 by releasing the friction washers 114 so that the contact surface 408 of the collar 104 remains securely coupled to the rim 1302 of the toilet bowl 1304.

In some instances, the user can further stabilize the device 1300 to the coupling adaptor 600 and the rim 1302 of the toilet 1301 by depressing the locking elements 118,119 (e.g., one at a time) to unlock and insert the extension elements 406,(506',506") further into the collars 104,105, respectively. The user can then release the locking elements 118,119 such that the locking elements 118,119 will automatically reenter the locked mode when one of the grooves 422,(522',522") becomes adjacent to the locking element 118,119, respectively. In this way, the collars 104,105 can be positioned closer to the rim 1302 of the toilet 1301 and the coupling adaptor 600 to provide a more stable coupling to the rim 1302 and the coupling adaptor 600, respectively. In some instances, the collars 104,105 or the elongated member 101 can abut the top of the rim 1302 or the coupling adaptor 600 and provide extra stability, respectively. When coupled securely, the device 1300 can have little to no sideway movement (or "slop") and can have little to no vertical (or up and down) movement. If the device 1300 does not feel solid and secure once coupled, the user can unlock and reposition one of the collars 104,105 until a snug fit is formed.

When the device 1300 is securely coupled to the coupling adaptor 600 and the rim 1302, as shown in FIG. 13B, the elongated member 101 can be used as a handle for the user to hold to move the toilet 1301. The user can move the toilet 1301 with one or both hands as desired. For example, the user can move the toilet 1301 with one hand without the need to bend over the device 1300 while securing the toilet 1301 with the free hand. As another example, two users can stand on each side of the toilet 1301 and hold the elongated member 101, for instance. When finished moving the toilet 1301, the user can remove the device 1300 by unlocking and displacing the collar 104 until the extension element 406 is no longer engaged under the rim 1302 of the toilet bowl 1304. The extension elements 506',506" can then be rotated so that the contact surfaces 508',508" extend outward. The end of the elongated member 101 with the collar 104 can then be rotated back upward about the axis extending through the holes 605, in order to orient the contact surfaces 508',508" closer to a vertical orientation. The contact surfaces 508',508" can then be removed from the holes 605 in the coupling adaptor 600. The device 1300 can then be used to move the same, or different, toilet 1301. In another embodiment, the device 1300 can be similarly utilized to couple the device 1300 to the rim of the toilet and directly to the neck of the toilet through a seat hole. For example, a similar method as described above for FIG. 13 can be followed, except that the coupling adaptor 600 is not necessary and can be excluded; the collar 105 can include a single extension element 506 inserted within either one of the extension through-holes of the collar 105; and, the contact surface 508 can be inserted within one of the seat holes on the neck of the toilet.

Engaging a Toilet Utilizing a Stabilizing Adaptor

As previously described, the stabilizing adaptor 700 shown in FIG. 7 can be coupled to a device for moving a toilet to provide stability to the toilet when mounting the toilet. FIG. 14 depicts the stabilizing adaptor 700 shown in FIG. 7 when coupled to the device 1000 shown in FIGS. 10A and 10B, according to an embodiment. Accordingly, FIG. 14 is described together herein with reference to FIGS. 7, 10A, and 10B. Reference numerals for common features shown in FIGS. 7, 10A, and 10B may also be indicated in FIG. 14. It should be appreciated that other devices and configurations can also similarly apply here, such as the device 1300 shown in FIGS. 13A and 13B for instance.

The toilet 1416 is configured to sit off the ground 1417 and mount to the wall mount 1415 on the wall 1414, as opposed to the floor. When using the device 1000 to mount the toilet 1416 to the wall mount 1415 on the wall 1414, the user can find it difficult to hold the toilet 1416 up with one hand and align and mount the toilet 1416 to the wall mount 1415 with the free hand. When the toilet 1416 is to be mounted to the wall mount 1415, the device 1000 can be coupled to the toilet 1416 in the 12 o'clock and 6 o'clock position following one of the previously described methods described in FIGS. 8-13, such as the methods described in FIGS. 10A, 10B, 13A, and 13B. The description here will assume that for the device 1000, the end of the elongated member 101 in the 6 o'clock position has the collar 104 and the end cap 126 coupled thereto. For the sake of clarity, the steps of coupling the device 1000 of FIGS. 10A and 10B (or the steps of coupling the device 1300 of FIGS. 13A and 13B) are not repeated again here.

Once securely engaged with the toilet 1416, the user can hold the elongated member 101 with one hand and move the toilet 1416 to the approximate location of the wall mount 1415. Because the toilet 1416 can obstruct the user's view of the wall mount 1415, it can be difficult for the user to accurately position the toilet 1416 onto the wall mount 1415 and to secure (e.g., bolt or screw) the toilet 1416 to the wall mount 1415 while holding the toilet 1416 up with the device 100. The user can take the stabilizing adaptor 700 with the free hand and couple the connection unit 702 of the stabilizing adaptor 700 to the end of the elongated member 101 in the 6 o'clock position. For example, the coupling element 704 can be inserted into the hole in the end cap 126 at the end of the elongated member 101. The base 711 of the elongated member 101 can be suspended in the air and not contacting the ground 1417 when inserting the coupling element 704 into the hole in the end cap 126. The user can then unlock the collar 703 on the stabilizing adaptor 700 by squeezing the friction washer 706 towards the collar 703. When the collar 703 is unlocked, the elongated member 701 of the stabilizing adaptor 700 is free to displace within the hole of the collar 703 and displaces downward until the base 711 contacts the ground 1417. Once the base 711 contacts the ground 1417, the user can release the friction washer 706 to lock the collar 703 longitudinally along the elongated member 701. In this way, the elongated member 701 can be locked at the appropriate height to stabilize and prop up the front end of the toilet 1416. The base 711 can be positioned on the ground 1417 as needed to provide stability, as shown in FIG. 14. The elongated member 701 can be angled such that the base 711 is slightly further away from the toilet 1416 than the end of the elongated member 701 with the end cap 710. This can provided extra stability when propping up the toilet 1416. The user can now let go of the elongated member 101 on the device 100 and attend to mounting the toilet 1416 to the wall mount 1415. For example, the user can look behind the toilet 1416 and slightly adjust the toilet 1416 to accurately mount the toilet 1416 to the wall mount 1415 if necessary. The user can also secure the toilet 1416 to the wall mount 1415 while the stabilizing adaptor 700 stabilizes the toilet 1416.

In some instances, the toilet 1416 may need to be moved significantly to align or secure the toilet 1416 to the wall mount 1415. In such case, the user can hold the device 100 to again move the toilet 1416 while adjusting the stabilizing adaptor 700 as necessary to provide stability. In some instances, the toilet 1416 can be realigned while maintaining the stabilizing adaptor 700 coupled to the device 100. In other instances, the user can hold the device 100 and remove the stabilizing adaptor 700 before realigning the toilet 1416. After realigning the toilet 1416, the stabilizing adaptor 700 can again be coupled to the device 100 as described above to stabilize the front end of the toilet 1416.

Once the toilet 1416 is secured to the wall mount 1415, the user can remove the stabilizing adaptor 700 from the device 100 by removing the coupling element 704 from the hole in the end cap 126. If necessary, the collar 703 can be unlocked and the elongated member 701 displaced to lift the base 711 off the ground 1417 enough to remove the coupling element 704. The device 100 can then be removed from the toilet 1416, as similarly described above for FIGS. 10A and 10B.

Various other modifications and alternations in the device and methods of operation of the present disclosure will be apparent to those skilled in the art without departing from the scope and spirit of the present disclosure. Although the present disclosure has been described in connection with specific preferred embodiments, it should be understood that the present disclosure as claimed should not be unduly limited to such specific embodiments.

In certain aspects, various embodiments of the devices and methods described herein can provide one or more benefits to the user when moving the toilet, such as one or more of the following benefits. A single user can move the toilet with one or both hands. Two or more users can hold the elongated member to move the toilet while standing on opposite sides of the toilet. The user can transport the toilet up and down stairs in a smooth manner. The user can stand upright on one side of the toilet while moving the toilet. The user is not required to bend over far to lift the toilet since the elongated member is used as a handle and can be maintained at, or above, the height of the toilet bowl. The user is not required to bend over and secure the toilet with a free hand while holding the toilet against a wall mount with the other hand, such as when utilizing a stabilizing adaptor. The user is not required to straddle over the toilet while bending over to move the toilet. The user can transport the toilet up and down stairs, or over uneven or rough surfaces, in a smooth manner. Example applications for the device can include, but are not limited to, transporting a toilet, repairing a toilet, removing a toilet, installing a toilet, etc. More specific example activities or repairs can include, but are not limited to, setting a toilet on a new wax ring, replacing a wax ring, unclogging a toilet, mounting a toilet to wall mount or floor mount, connecting the toilet to anchor bolts or flange bolts, etc. Various types of users can use the device, such as homeowners, tenants, construction workers, plumbers, etc. The device can be small and lightweight, which can make it portable and easy to store, transport, carry, and use. The device can be convenient and simple to use. The device can be inexpensive and easy to manufacture. The device can be a much more cost-effective solution than larger systems on the market. The device can provide various sanitary benefits as well. For example, the user is not required to insert any hands into the toilet bowl to couple the device to move the toilet. Furthermore, the elongated member of the device does not enter the inside of the toilet bowl. Further, the elongated member is not required to necessarily touch the rim or the neck of the toilet. Still further, once the user if finished moving the toilet, the user can remove the extension elements for cleaning, such as steam cleaning.

Kits

In certain aspects of the present disclosure, kits for use in practicing the above-described methods are also provided. The kits can include one or more toilet moving devices; one or more components of the toilet moving devices (e.g., the elongated member, the collars, the extension elements, the locking mechanisms, the engaging members as a whole, the end caps, etc.); one or more adaptors configured to work in conjunction with the toilet moving devices (e.g., adaptors to couple to the neck of the toilet, or adaptors to stabilize the toilet); one or more components of the adaptors; or any combination of one or more of the preceding items listed. It should be appreciated that the kit can include one or more devices for moving a toilet that does not include one or more functional components, such as a device for moving a toilet without one or both extension elements included. The kits can further include other items that can find use in practicing the subject methods. Various components can be packaged as desired, e.g., together or separately.

In addition to above-mentioned items, the subject kits can further include instructions for using the components of the kit to practice the subject methods. The instructions for practicing the subject methods are generally recorded on a suitable recording medium. For example, the instructions can be printed on a substrate, such as paper or plastic, etc. As such, the instructions can be present in the kits as a package insert, in the labeling of the container of the kit or components thereof (i.e., associated with the packaging or subpackaging) etc. In other embodiments, the instructions are present as an electronic storage data file present on a suitable computer readable storage medium, e.g. CD-ROM, diskette, etc. In yet other embodiments, the actual instructions are not present in the kit, but means for obtaining the instructions from a remote source, e.g. via the internet, are provided. An example of this embodiment is a kit that includes a web address where the instructions can be viewed and/or from which the instructions can be downloaded. As with the instructions, this means for obtaining the instructions is recorded on a suitable substrate.

EXAMPLE EMBODIMENTS

In certain aspects, a hand-held device for moving a toilet is provided that can include an elongated member, a first engaging member, and a second engaging member. The first engaging member and the second engaging member can be coupled to the elongated member and extend radially away from the elongated member. The first engaging member can include a first contact surface that is disposed distal to the elongated member and that is configured to engage the toilet. The second engaging member can include a second contact surface that is disposed distal to the elongated member and that is configured to engage the toilet.

In one embodiment, the first engaging member can be displaceable longitudinally along the elongated member in a first unlocked mode, and the first engaging member can be fixed longitudinally along the elongated member in a first locked mode. In one embodiment, the second engaging member can be displaceable longitudinally along the elongated member in a second unlocked mode, and the second engaging member can fixed longitudinally along the elongated member in a second locked mode. In one embodiment, the first engaging member can include a first connector coupled to the elongated member and a first extension element coupled to the first connector. The first connector can be displaceable longitudinally along the elongated member in the first unlocked mode, and the first connector can be fixed longitudinally along the elongated member in the first locked mode. The first extension element can include the first contact surface disposed distal to the elongated member. In one embodiment, the second engaging member can include a second connector coupled to the elongated member and a second extension element coupled to the second connector. The second connector can be displaceable longitudinally along the elongated member in the second unlocked mode, and the second connector can be fixed longitudinally along the elongated member in the second locked mode. The second extension element can include the second contact surface disposed distal to the elongated member. In one embodiment, the first connector can be a first collar and the first extension element can be a first shackle. The second connector can be a second collar and the second extension element can be a second shackle. In one embodiment, the first collar can be configured to secure to the first shackle with the first shackle disposed in one or more first through-holes in a first body of the first collar, and the second collar can be configured to secure to the second shackle with the second shackle disposed in one or more second through-holes in a second body of the second collar. In one embodiment, the first extension element can be removably coupled to the first connector, and the second extension element can be removably coupled to the second connector.

In one embodiment, a first distance that the first contact surface is disposed distal to the elongated member can be adjustable, and a second distance that the second contact surface is disposed distal to the elongated member can be adjustable.

In certain aspects, a method of moving a toilet is provided that can include coupling a hand-held device to the toilet.

The hand-held device can include an elongated member, a first engaging member, and a second engaging member. The first engaging member and the second engaging member can be coupled to the elongated member and extend radially away from the elongated member. The first engaging member can include a first contact surface that is disposed distal to the elongated member and that is configured to engage the toilet. The second engaging member can include a second contact surface that is disposed distal to the elongated member and that is configured to engage the toilet. The method can also include applying force to the elongated member to move the toilet.

In one embodiment, the coupling of the hand-held device to the toilet can further include engaging a rim of the toilet with the first contact surface, and engaging the rim of the toilet with the second contact surface. In one embodiment, the method can further include coupling a stabilizing adaptor to the hand-held device coupled to the toilet; maintaining the toilet off ground and against a wall mount with the applied force to the elongated member; propping up the toilet with the stabilizing adaptor while maintaining the toilet off the ground and against the wall mount with the applied force; and removing the applied force to the elongated member. The stabilizing adaptor can prop up the toilet off the ground and against the wall mount after the applied force is removed.

In one embodiment, the coupling of the hand-held device to the toilet can further include engaging a neck of the toilet with the first contact surface, and engaging the neck of the toilet with the second contact surface. The first contact surface and the second contact surface can engage the neck from around the neck.

In one embodiment, the coupling of the hand-held device to the toilet can further include engaging a neck of the toilet with the first contact surface, and engaging the neck of the toilet with the second contact surface. The first contact surface and the second contact surface can engage the neck through seat holes in the neck of the toilet.

In one embodiment, the method can further include coupling an adaptor to a neck of the toilet. The coupling of the hand-held device to the toilet can further include engaging the neck of the toilet with the first contact surface; and engaging the neck of the toilet with the second contact surface. The first contact surface and the second contact surface can engage the neck via the adaptor coupled to the neck.

In one embodiment, the method can further include coupling an adaptor to a neck of the toilet. The coupling of the hand-held device to the toilet can further include engaging the neck of the toilet with the first contact surface, and engaging a rim of the toilet with the second contact surface. The first contact surface can engage the neck via the coupling adaptor coupled to the neck. The method can further include coupling a stabilizing adaptor to the hand-held device coupled to the toilet; maintaining the toilet off ground and against a wall mount with the applied force to the elongated member; propping up the toilet with the stabilizing adaptor while maintaining the toilet off the ground and against the wall mount with the applied force; and removing the applied force to the elongated member. The stabilizing adaptor can prop up the toilet off the ground and against the wall mount after the applied force is removed.

In one embodiment, the method can further include coupling an adaptor to a neck of the toilet. The coupling of the hand-held device to the toilet can further include engaging a neck of the toilet with the first contact surface, and engaging a rim of the toilet with the second contact surface. The first contact surface can engage the neck through a seat hole in the neck. e method can further include coupling a stabilizing adaptor to the hand-held device coupled to the toilet; maintaining the toilet off ground and against a wall mount with the applied force to the elongated member; propping up the toilet with the stabilizing adaptor while maintaining the toilet off the ground and against the wall mount with the applied force; and removing the applied force to the elongated member. The stabilizing adaptor can prop up the toilet off the ground and against the wall mount after the applied force is removed.

In certain aspects of the present disclosure, a hand-held device for moving a toilet is provided that can include a handle, a first collar, and a second collar. The first collar can be coupled to the handle and can be configured to slide along the handle in a first unlocked mode and to positionally secure along the handle in a first locked mode. The first collar can be configured to receive and secure to one or more removable shackles. The second collar can be coupled to the hand and can be configured to slide along the handle in a second unlocked mode and to positionally secure along the handle in a second locked mode. The second collar can be configured to receive and secure to one or more removable shackles.

In one embodiment, the device can include a first removable shackle secured to the first collar and a second removable shackle secured to the second collar. The first removable shackle can extend away from the handle and can have a first surface for contacting the toilet. The second removable shackle can extend away from the handle and can have a second surface for contacting the toilet. In one embodiment, the first collar can be configured to secure to one or more grooves on the first removable shackle when the first removable shackle is inserted within one or more first through-holes in the first collar. The second collar can be configured to secure to one or more grooves on the second removable shackle when the second removable shackle is inserted within one or more second through-holes in the second collar.

In certain aspects of the present disclosure, a method of moving a toilet is provided that can include coupling a hand-held device to the toilet. The hand-held device can include a handle, a first collar, and a second collar. The first collar can be coupled to the handle and can be configured to slide along the handle in a first unlocked mode and to positionally secure along the handle in a first locked mode. The first collar can be configured to receive and secure to one or more removable shackles. The second collar can be coupled to the hand and can be configured to slide along the handle in a second unlocked mode and to positionally secure along the handle in a second locked mode. The second collar can be configured to receive and secure to one or more removable shackles.

Experimental Examples

The following examples are put forth so as to provide those of ordinary skill in the art with a complete disclosure and description of how to make and use the embodiments of the invention, and are not intended to limit the scope of what the inventors regard as their invention nor are they intended to represent that the experiments below are all or the only experiments performed. Efforts have been made to ensure accuracy with respect to numbers used (e.g., lengths, widths, diameters, etc.) but some experimental errors and deviations should be accounted for. Furthermore, the following examples are provided with illustrative shapes, sizes, materials, and measurements. It should be appreciated that the shapes, sizes, materials, and measurements provided are illustrative and are not intended to be limiting. It should be appreciated that other shapes, sizes, materials, and measurements can be implemented in other embodiments without compromising the underlying principles of the present disclosure.

In one experimental example for the device 100 shown in FIGS. 1A and 1B, the elongated member 101 of the device 100 (e.g., the device 100 shown in FIGS. 1A and 1B) can be made from a stainless steel cylindrical tube having a 1-inch outside diameter, a 0.065-inch thick wall, and an 18-inch length. The end caps 126,127 and the collars 104,105 of the device 100 can be made of high strength industrial plastic, such as one from the King Starboard® family of plastics made by King Plastic Corporation. The end caps can include a 5/16 in. hole to enable a stabilizing adaptor (e.g., the stabilizing adaptor 700 shown in FIG. 7) to couple to the device 100. The friction washers 114 can be made out of a 16-gauge stainless steel sheet and can be oval (or egg shaped) with the widest width being 2 in. and the shortest width 1¾ in. The friction washers 114 can be bent with a slightly curved (or "S") shape to provide angled surface tension to increase friction against the elongated member 101. The friction washers 114 can have a 1 1/32 in. main hole and a smaller ¼ in. hole disposed approximately 3/16 in. under the main hole. The main hole can enable the friction washers 114 to displace longitudinally along the elongated member 101 as needed or to remain fixed when secured. The retaining rod 116 can be disposed within the smaller ¼ in. hole and can secure the friction washers 114 to the collar 104. A 10-24 nut can be screwed to each end of the retaining rod 116 to secure the retaining rod 116 to the friction washers 114. The springs 112 can be spring tempered compression springs having a 1.218 in. outside diameter, a 0.08 wire diameter, and a 1 in. length. The springs 112 can include approximately two full revolutions of coils. The extension elements 106,107 can be made of a 5/16 in. stainless steel rod. The legs 124,125 of the extension elements 106,107 can be approximately 8½ in. and can include three pairs of grooves 122,123, respectively. The extension elements 106,107 can have a rubber coating over the contact surfaces 108,109 and over approximately 2 in. of the legs 124,125 of the extension elements 108,109, respectively. The locking element 118 can be made from an acetal plastic rod having a 5/16 in. diameter and a 2 7/8 in. length. The locking element 118 can include the notch 134 having a ¾ in. length and a 3/16 in. depth. The spring 133 can be a steel hardened compression spring having a 0.187 in. outside diameter, a 0.018 in. wire diameter, and a ¾ in. length. When placed in the collar 104, the retaining rod 116 can be disposed in the notch 134 to provide the force that biases the locking element 118 in the locked mode. The retaining rod 116 can be stainless steel and can have a 3/16 in. diameter and a 1¾ in. length. The retaining rod 116 can be tapped on each end to secure a 10-24 nut. The retaining rod 116 can be disposed within the retaining through-hole 132 after the locking element 118 and the spring 133 have been inserted into the locking through-hole 131. In this way, the retaining rod 116 can retain the friction washers 114 and provide a stop for the locking element 118 and the spring 133.

In one experimental example for the collar 104 shown in FIGS. 2A, 2B, and 2C, the body 120 of the collar 104 can be 1 in. thick, 2½ in. wide, and 2¼ in. long. Furthermore, the body 120 can be made from a high strength industrial plastic, such as one from the King Starboard® family of plastics made by King Plastic Corporation. The main through-hole 128 can have a diameter of 1 1/32 in. The through-holes 129,130 can have a 5/16 in. diameter and can be disposed approximately 1¾ in. apart. The locking through-hole 131 can have a 5/16 in. diameter and can cut through 1/16 in. of the edge of each of the extension through-holes 129,130. The retaining through-hole 132 can have a ¼ in. diameter and can be disposed 3/16 in. below the main through-hole 128. The hole 142 can have a diameter of approximately ¼ in. and can be disposed approximately ⅛ in. from the locking through-hole 131.

In one experimental example for the extension element 106 shown in FIG. 3, the extension element 106 can made from a stainless steel rod having a 5/16 in. diameter and a 22 in. length. The center axes of the legs 124 can be approximately 1¾ in. apart to align with the extension through-holes 129,130. The extension element 106 can be bent approximately 90-degrees at 7½ in. from the ends of each of the legs 124. The length L1 of the contact surface 108 can be approximately 4 in. The contact surface 108 can be in the general shape of an isosceles triangle, with the sides 136,137 corresponding to the two equal sides of the isosceles triangle. For example, the sides 136,137 can be approximately 3¾ in. long and angled to provide the narrowing width W1. The grooves 122A,122B,122C can be spaced approximately 2 in. apart along the length of the legs. In this way, the contact surface 108 can be maintained at different distal distances from the elongated member varying by approximately 2 in. increments. The extension element 106 can include a rubber coating 140 over the contact surface 108 and approximately 2¼ in. up the legs 124.

In one experimental example for the extension element 406 shown in FIG. 4, the extension element 406 can be made from a stainless steel rod having a 5/16 in. diameter and a 23 in. length. The center axis of the legs 424 of the extension element 406 can be approximately 1¾ in. apart to align with the extension through-holes 129,130. The extension element 406 can be bent 90 degrees at approximately 7½ in. from the ends of each leg 424 of the extension element 106. The contact surface 408 can be in the general shape of an isosceles trapezoid, with the sides 436,437,438 corresponding to only three of the sides of the isosceles trapezoid. For example, the sides 436,437 can be the two non-parallel legs of the trapezoid, while the side 438 can be the longer base of the trapezoid. The sides 436,437 can be 2½ in. long and can be angled out at 45-degrees. The side 438 can have a 4 in. length. The grooves 422A,422B,422C can be spaced approximately 2 in. apart along the length of the legs 424. In this way, the contact surface 408 can be maintained at different distal distances from the elongated member 101 varying by approximately 2 in. increments. The extension element 406 can include a rubber coating over the contact surface 408 and approximately 2¼ in. up the legs 424.

In one experimental example for the extension element 506 shown in FIG. 5, the extension element 506 can be made from a stainless steel rod having a 5/16 in. diameter and a 6½ in. length. The extension element 506 can be bent approximately 90-degrees at one end to form a 1½ in. lip that can be inserted through the seat hole of the toilet and utilized as the contact surface 508 that contacts the bottom side of the neck of the toilet when engaged. The grooves 522A,522B can be spaced approximately 2 in. apart along the length of the leg 524. In this way, the contact surface 508 can be maintained at different distal distances from the elongated member 101 varying by approximately 2 in. increments. The extension element 506 can include a rubber coating over the contact surface 508 and approximately 2¼ in. up the leg 524.

In one experimental example for the coupling adaptor 600 shown in FIG. 6, the body 601 of the coupling adaptor 600 can be approximately 9 in. long and 2¾ in. wide. The spacing elements 602 can be cylinders having a 1¼ in. diameter and a 2 in. length. The spacing elements 602 can be screwed to the body 601 and can provide a space of 2 in. between the neck of the toilet and the body of the adaptor when coupled to the toilet. The holes 604,605 can be approximately ⅝ in. diameter holes and can be utilized to receive the extension element 506. The holes 604 can be disposed along the central longitudinal axis of the body 601 and can be approximately 1⅜ in. from the longitudinal ends of the body 601. The centers of each of the holes 605 can be disposed approximately 1¾ in. apart from each other and can be disposed symmetrically across the central horizontal axis of the body 601. The holes 606 can be approximately ⅜ in. in width and approximately 2 in. in length, and can be disposed near the longitudinal ends of the body 601. The body 601 and spacing elements 602 can be made from a high strength industrial plastic, such as one from the King Starboard® family of plastics made by King Plastic Corporation. The securing element 603 can be a strap made from Nylon, for example, or other material that is strong enough to support the weight of the toilet during use.

In one experimental example for the stabilizing adaptor 700 shown in FIG. 7, the elongated member 701 can be a stainless steel cylindrical tube having approximately a 1-inch outside diameter, a 0.065-inch thick wall, and a 21-inch length. The end cap 710, the base 711, and collar 703 can be made of high strength industrial plastic, such as one from the King Starboard® family of plastics made by King Plastic Corporation. The coupling element 704 of the collar 703 can be a stainless steel rod having a 5/16 in. diameter and 5 in. length. The through-hole of the collar 703 that receives the elongated member 701 can have a diameter of 1 1/32. The hole of the collar 703, in which the retaining rod 708 is disposed, can have a ¼ in. diameter and can be disposed 3/16 in. below, and parallel to, the through-hole receiving the elongated member 701.

Throughout the foregoing description, and for the purposes of explanation, numerous specific details are set forth in order to provide a thorough understanding of the described techniques. It will be apparent, however, to one skilled in the art that these techniques can be practiced without some of these specific details. Although various embodiments that incorporate these teachings have been shown and described in detail, those skilled in the art could readily devise many other varied embodiments or mechanisms to incorporate these techniques. Also, embodiments can include various operations as set forth above, fewer operations, or more operations; or operations in an order. Accordingly, the scope and spirit of the invention should be judged in terms of the claims, which follow as well as the legal equivalents thereof.

What is claimed is:

1. A hand-held device for moving a toilet, the device comprising:
    an elongated member;
    a first connector coupled to the elongated member;
    a first extension element coupled to the first connector and extending radially away from the elongated member, the first extension element comprising a first contact surface configured to engage the toilet, the first contact surface disposed distal to the elongated member;
    wherein the first connector comprises:
        a first body;
        a first locking element disposed in the first body and configured to slide between a first locked position and a first unlocked position, wherein the first locking element enables the first extension element to be secured within the first connector when in the first locked position, and wherein the first locking element enables the first extension element to be unsecured within the first connector when in the first unlocked position; and
        one or more first through-holes disposed in the first body, wherein the first extension element is displaceable within the one or more first through-holes, wherein the one or more first through-holes are partially obstructed by the first locking element when the first locking element is in the first locked position, and wherein one or more first grooves in the first locking element enable the one or more first through-holes to be unobstructed when the first locking element is in the first unlocked position;
    a second connector coupled to the elongated member; and
    a second extension element coupled to the second connector and extending radially away from the elongated member, the second extension element comprising a second contact surface configured to engage the toilet, the second contact surface disposed distal to the elongated member;
    wherein the hand-held device is configured to operably couple to and move the toilet without contacting the ground.

2. The hand-held device of claim 1, wherein at least one of the first connector and the second connector is displaceable longitudinally along the elongated member in a first unlocked mode and fixed longitudinally along the elongated member in a first locked mode.

3. The hand-held device of claim 2, wherein the second connector comprises:
    a second body;
    a second locking element disposed in the second body and configured to slide between a second locked position and a second unlocked position, wherein the second locking element enables the second extension element to be secured within the second connector when in the second locked position, and wherein the second locking element enables the second extension element to be unsecured within the second connector when in the second unlocked position; and
    one or more second through-holes disposed in the second body, wherein the second extension element is displaceable within the one or more second through-holes, wherein the one or more second through-holes are partially obstructed by the second locking element when the second locking element is in the second locked position, and wherein one or more second grooves in the second locking element enable the one or more second through-holes to be unobstructed when the second locking element is in the second unlocked position.

4. The hand-held device of claim 1, wherein the first extension element is a shackle bent at an end to form the first contact surface, and wherein the first contact surface is V-shaped.

5. The hand-held device of claim 1, wherein the first extension element is a shackle bent at an end to form the first contact surface, and wherein the first contact surface is shaped as three sides of an isosceles trapezoid.

6. The hand-held device of claim 1, wherein the first extension element is a shackle bent at an end to form the first contact surface, and wherein the first contact surface is L-shaped.

7. The hand-held device of claim 1, wherein the first extension element comprises a plurality of second grooves, and wherein the plurality of second grooves enable the first extension element to be adjustable along a radial direction extending from the elongated member such that a distal distance between the first contact surface and the elongated member is adjustable.

8. A hand-held device for moving a toilet, the device comprising:
a handle;
a first collar coupled to the handle;
a first shackle coupled to the first collar, wherein the first shackle is bent at a first end to form a first platform configured to be positioned against the toilet;
a second collar coupled to the handle; and
a second shackle coupled to the second collar, wherein the second shackle is bent at a second end to form a second platform to be positioned against the toilet;
wherein the hand-held device is configured to operably secure to and move the toilet without contacting the ground; and
wherein the first shackle is adjustable along a radial direction extending from the handle such that a distal distance between the first platform and the handle is adjustable.

9. The hand-held device of claim 8, wherein the first collar is configured to slide along the handle in a first unlocked mode and to positionally secure along the handle in a first locked mode.

10. The hand-held device of claim 9, wherein the second shackle is adjustable along a radial direction extending from the handle such that a distal distance between the second platform and the handle is adjustable; and
wherein the second collar is configured to slide along the handle in a second unlocked mode and to positionally secure along the handle in a second locked mode.

11. The hand-held device of claim 8, wherein the first shackle comprises one or more grooves on a side of the first shackle such that the first shackle is securable to the first collar with the first platform extending in a first direction and prevented from securing to the first collar with the platform extending in a second direction opposite the first direction.

12. The hand-held device of claim 8, wherein the first shackle comprises one or more grooves around the first shackle such that the first shackle is securable to the first collar and rotatable when secured.

13. The hand-held device of claim 8, wherein the first collar is configured to secure to the first shackle with the first shackle disposed in one or more first through-holes in the first collar.

14. The hand-held device of claim 8, wherein the second shackle is adjustable along a radial direction extending from the handle such that a distal distance between the second platform and the handle is adjustable.

15. The hand-held device of claim 14, wherein the first collar is configured to slide along the handle in a first unlocked mode and to positionally secure along the handle in a first locked mode; and
wherein the second collar is configured to slide along the handle in a second unlocked mode and to positionally secure along the handle in a second locked mode.

16. The hand-held device of claim 15, further comprising:
a first means for securing the first shackle to the first collar; and
a second means for securing the second shackle to the second collar.

17. The hand-held device of claim 8, wherein the first shackle is removably coupled to the first collar, wherein the second shackle is removably coupled to the second collar, and wherein the first collar and the second collar are configured to couple to more than one type of shackle.

18. A hand-held device for moving a toilet, the device comprising:
a handle;
a first collar coupled to the handle;
a first shackle coupled to the first collar and extending radially away from the handle, the first shackle comprising a first platform configured to be positioned against the toilet, the first platform disposed distal to the handle;
wherein the first collar comprises:
a first locking lever configured to slide between a first closed position and a first open position, wherein the first locking lever enables the first shackle to be secured in the first collar when in the first closed position, and wherein the first locking lever enables the first shackle to slide in and out of the first collar when in the first open position; and
one or more first through-holes for receiving the first shackle and for enabling the first shackle to slide within the first collar, wherein one or more first grooves in the first locking lever matches with the one or more first through-holes when the first locking lever is in the first open position, and wherein the first locking element is configured to secure to the first shackle within the one or more first through-holes when the first locking element is in the first closed position;
a second collar coupled to the handle; and
a second shackle coupled to the second collar and extending radially away from the handle, the second shackle comprising a second platform configured to be positioned against the toilet, the second platform disposed distal to the handle;
wherein the hand-held device is configured to operably couple to and move the toilet without contacting the ground.

19. The hand-held device of claim 18, wherein the first collar is configured to slide along the handle in a first unlocked mode and to positionally secure along the handle in a first locked mode, and wherein the second collar is configured to slide along the handle in a second unlocked mode and to positionally secure along the handle in a second locked mode.

20. The hand-held device of claim 18, wherein the first shackle comprises a plurality of second grooves, wherein the plurality of second grooves enable the first shackle to be adjustable along a radial direction extending from the handle such that a distal distance between the first platform and the handle is adjustable.

21. The hand-held device of claim 18, wherein the first shackle comprises one or more second grooves on a side of the first shackle such that the first shackle is securable to the first collar with the first platform extending in a first direction and prevented from securing to the first collar with the first platform extending in a second direction opposite the first direction.

22. The hand-held device of claim 18, wherein the first shackle comprises one or more second grooves around the first shackle such that the first shackle is securable to the first collar and rotatable when secured.

23. The hand-held device of claim 18, wherein the second collar comprises:
- a second locking lever configured to slide between a second closed position and a second open position, wherein the second locking lever enables the second shackle to be secured in the second collar when in the second closed position, and wherein the second locking lever enables the second shackle to slide in and out of the second collar when in the second open position; and
- one or more second through-holes for receiving the second shackle and for enabling the second shackle to slide within the second collar, wherein one or more second grooves in the second locking lever matches with the one or more second through-holes when the second locking lever is in the second open position, and wherein the second locking element is configured to secure to the second shackle within the one or more second through-holes when the second locking element is in the second closed position;

wherein the first collar is configured to slide along the handle in a first unlocked mode and to positionally secure along the handle in a first locked mode, and wherein the second collar is configured to slide along the handle in a second unlocked mode and to positionally secure along the handle in a second locked mode; and wherein the first shackle comprises a plurality of third grooves for securing the first shackle to the first collar, the plurality of third grooves having a shape that matches an arc of the first locking lever, wherein the plurality of third grooves enable the first shackle to be adjustable along a radial direction extending from the handle such that a distal distance between the first platform and the handle is adjustable.

* * * * *